(12) United States Patent
Hisai et al.

(10) Patent No.: US 8,118,957 B2
(45) Date of Patent: Feb. 21, 2012

(54) VIBRATION WELDING METHOD AND VIBRATION WELDING APPARATUS

(75) Inventors: Kenji Hisai, Tochigi-ken (JP); Shuji Kanamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 285 days.

(21) Appl. No.: 12/367,166

(22) Filed: Feb. 6, 2009

(65) Prior Publication Data

US 2009/0211694 A1  Aug. 27, 2009

(30) Foreign Application Priority Data

Feb. 27, 2008 (JP) ................................. 2008-046043
Feb. 27, 2008 (JP) ................................. 2008-046044
Apr. 10, 2008 (JP) ................................. 2008-102683

(51) Int. Cl.
*B32B 37/00* (2006.01)
(52) U.S. Cl. ...................................... 156/73.5; 156/580
(58) Field of Classification Search ................ 156/73, 156/308.2, 580, 580.2, 73.5; 264/68; 228/2.1, 228/112.1
See application file for complete search history.

(56) References Cited

U.S. PATENT DOCUMENTS

| | | | | |
|---|---|---|---|---|
| 5,205,887 | A | * | 4/1993 | Yabuya et al. ............... 156/73.5 |
| 6,797,089 | B2 | * | 9/2004 | Brahm et al. ................ 156/73.5 |

FOREIGN PATENT DOCUMENTS

| | | |
|---|---|---|
| CN | 1439552 A | 9/2003 |
| JP | 2000-043567 A | 2/2000 |
| JP | 2001-232686 A | 8/2001 |

* cited by examiner

*Primary Examiner* — James Sells
(74) *Attorney, Agent, or Firm* — Arent Fox LLP

(57) ABSTRACT

In a vibration welding method and a vibration welding apparatus, a base plate and a vibrating plate which can be vibrated relatively to each other clamp an instrument panel, a storage box, and a duct as layers therebetween, which are joined to each other under pressure with vibration. A protective member of urethane is disposed on a workpiece rest for placing the base plate thereon. The storage box is made of a material having a relatively low melting point, and the duct is made of a material having a relatively high melting point. The thickness of the protective member is different depending on the location where the protective member supports the resin base, and the storage box or the duct.

18 Claims, 19 Drawing Sheets

FIG. 13

[UNIT: mm]

| PRESSING ANGLE θ2 [°] | ANGLE IN VIBRATING DIRECTION θ1 [°] | | | | | | |
|---|---|---|---|---|---|---|---|
| | 0 | 2 | 4 | 6 | 8 | 10 | |
| 0 | 5 | 7 | 9 | 10 | 8 | 10 | |
| 5 | 5 | 7 | 8 | 10 | 10 | 12 | |
| 10 | 5 | 6 | 7 | 9 | 10 | 11 | |
| 15 | 5 | 6 | 7 | 9 | 10 | 11 | |
| 20 | 5 | 6 | 7 | 9 | 10 | 10 | |
| 25 | 5 | 5 | 6 | 8 | 9 | 10 | |
| 30 | 5 | 5 | 6 | 8 | 9 | 10 | |

VIBRATION WELDING METHOD AND VIBRATION WELDING APPARATUS

CROSS-REFERENCE TO RELATED APPLICATION

This application claims the priority of Japanese Application Nos. JP 2008-046043, filed Feb. 27, 2008, JP 2008-046044, filed Feb. 27, 2008 and JP 2008-102683, filed Apr. 10, 2008, the entire specifications, claims and drawings of which are incorporated herewith by reference.

BACKGROUND OF THE INVENTION

1. Field of the Invention

The present invention relates to a vibration welding method and a vibration welding apparatus for welding a resin base and a resin workpiece to each other as layers by clamping, pressing, and vibrating them with a pair of vibratory members which are vibrated relatively to each other.

2. Description of the Related Art

It has heretofore been customary in the art to join a resin component to another resin component by vibration welding. The vibration welding process requires no adhesive and is not followed by a subsequent process such as a heat drying process. The vibration welding process is advantageously used to join interior finishing members for automobiles, for example. Since importance is attached to the appearance of interior finishing members for automobiles, it is desirable to prevent the interior finishing members from being deformed by excessive vibration welding and also from being scratched by vibrations.

Japanese Laid-Open Patent Publication No. 2000-043567 discloses a bearing jig for a vibration welding product, having resilient members for absorbing partial thickness differences in superposed portions for thereby keeping the pressure of a vibratory jig at a constant level.

For welding members molded of one type of resin material, appropriate conditions may be set depending on the material and shape of the members to be welded thereby to achieve necessary appearance quality and joining strength.

Japanese Laid-Open Patent Publication No. 2001-232686 discloses a vibration welding jig having a urethane resin layer on its surface for contacting a product for thereby maintaining the appearance of the product. Specifically, the publication reveals the vibration welding of an air-conditioning duct member to an instrument panel as an interior finishing member of an automobile. The urethane resin layer on the vibration welding jig is provided as a protective member for the product surface, and has a uniform small thickness with no special consideration given thereto.

According to the related art disclosed in the latter publication, the duct member is supported on a lower jig which is shaped complementarily to the duct member, and the instrument panel is supported on an upper jig which is shaped complementarily to the instrument panel. The lower jig and the upper jig support the duct member and the instrument panel, respectively, over their entire surfaces.

A surface which supports the instrument panel is supported on the upper jig by the protective member, and is clamped together with the instrument panel and the duct member between the upper jig and the lower jig.

The upper jig is displaced toward the lower jig, and horizontally displaced back and forth relatively to the lower jig. The instrument panel and the duct member are pressed and vibrated by the upper jig and the lower jig.

The surfaces of the instrument panel and the duct member are held in frictional contact with each other and melted by frictional heat. Finally, the melted surfaces of the instrument panel and the duct member are solidified, joining the instrument panel and the duct member to each other.

The storage box of a front passenger SRS (Supplemental Restraint System) air bag, a duct of an air conditioner, etc. are joined to the reverse side of the instrument panel of the automobile by vibration welding. The storage box and the duct are made of different materials because of their required specifications. For example, the storage box is made of TPO (thermoplastic olefin) which is pliable and has a relatively low melting point, because it functions as a hinge for opening its front side at the time the air bag is inflated, and the duct is made of PP (polypropylene) having a relatively high melting point.

Heretofore, these different workpieces are joined to the instrument panel in different processes by vibration welding. If they are joined to the instrument panel in one process under the same pressure and vibrating conditions, then the material having the low melting point tends to be melted more than the material having the high melting point, and hence the materials are welded irregularly. Either one of the workpieces is liable to have an insufficient level of mechanical strength. Also, at least one of the workpieces is likely to be melted to an excessive depth, tending to deform the designed front surface of the instrument panel where the members are welded. Any deformation of the designed front surface of the instrument panel is not preferable because it is highly important for the designed surface to have a pleasing appearance.

When the storage box and the duct are joined to the instrument panel in different processes by vibration welding under different pressures and different vibrating conditions, they are melted to respective appropriate depths for respective appropriate joining strengths, and the designed surface of the instrument panel is not deformed.

However, the different vibration welding processes are time-consuming and inefficient because they need respective processes for loading and unloading workpieces into and out of the vibration welding apparatus and also other preparatory processes.

Either one of the workpieces tends to be deformed when they are welded under the same pressure and vibrating conditions because they have different shapes.

The instrument panel has a complex curved surface including different locations held against supports such as welding jigs at different tilt angles. Since the instrument panel is vibrated while being held under a uniform pressure in the vibration welding process according to the related art, the instrument panel is caused to move in directions other than the desired vibrational direction because of the different tilt angles. As a result, the instrument panel is not uniformly welded to the other members. The weld portions of the instrument panel may have their welding quality lowered, and the vibration welding apparatus may have its service life shortened due to undue forces applied thereto.

To solve the above problems, it may be proposed to use different vibration welding apparatus each for welding locations having the same tilt angle. However, using the different vibration welding apparatus is not economical and efficient because the overall cost of the vibration welding apparatus is high and the number of manufacturing steps involved is large.

In addition, the duct has a plurality of weld portions, and it is not efficient to weld those portions in separate processes.

The instrument panel has a complex curved surface and a considerably wide area. For supporting the instrument panel over its entire surface, a bearing member for supporting the instrument panel needs to be of a complex shape complementary to the instrument panel, and the amount of protective material needed is large. It is desirable to find a simple way of supporting the resin base which is complex in shape and wide in area, and also to reduce the amount of protective material used.

It may be effective to insert spacers in portions of either the lower jig or the upper jig for supporting the workpiece having the high melting point to prevent the workpiece from being welded irregularly. However, since the lower jig and the upper jig support the duct and the instrument panel over their entire surfaces, the thickness of the spacers has to be established in view of manufacturing errors of the dimensions of the instrument panel and the duct in order to allow the spacers to be inserted in those portions. Accordingly, a lot of trial and error efforts are required to design the spacers.

If a spacer with an excessively large thickness is inserted into a jig portion, then the pressure applied to the jig portion is excessively high. In that jig portion, though the welding strength of the instrument panel and the workpiece having the high melting point is large, the visible designed surface of the instrument panel tends to be deformed and suffers damage to its appearance.

When members made of materials having different melting points are joined to each other in different processes by vibration welding, the number of manufacturing steps is increased, and a long period of time is required until a final product is completed.

SUMMARY OF THE INVENTION

It is an object of the present invention to provide a vibration welding method and a vibration welding apparatus for simultaneously welding two or more resin workpieces in one process without causing them to be deformed.

Another object of the present invention is to provide a vibration welding method and a vibration welding apparatus for increasing welding quality irrespective of tilt angles of a resin base at respective weld portions thereof and for simultaneously welding a plurality of weld portions having different tilt angles in one process.

Still another object of the present invention is to provide a vibration welding method and a vibration welding apparatus for substantially uniformizing the amounts of resin materials melted when resin components having different melting points are joined in the same process by vibration welding, for thereby easily producing a final welded product having an excellent appearance.

According to an aspect of the present invention, there is provided a vibration welding method for welding a resin base and resin workpieces to each other under pressure with vibration by clamping the resin base and the resin workpieces as layers between a first vibratory member and a second vibratory member, and then vibrating the first vibratory member and the second vibratory member relatively to each other, comprising the steps of holding at least two of the resin workpieces in contact with the resin base, and providing a protective member between the resin base and the first vibratory member and/or between the resin workpieces and the second vibratory member, wherein the thickness of the protective member is different depending on the location where the protective member supports the resin base and/or the resin workpieces.

The two or more resin workpieces can simultaneously be welded to the resin base in one process. The materials of the resin workpieces can be melted to sufficient depths, and the resin workpieces and the resin base are prevented from being deformed.

The at least two of the resin workpieces which are in contact with the resin base may be made of different materials, and the thickness of the protective member may be different depending on the material of the resin workpieces at the locations where the protective member supports the resin workpieces. The two or more resin workpieces which are made of different materials can simultaneously be welded to the resin base in one process. The materials of the resin workpieces can be melted to sufficient depths, and the resin workpieces and the resin base are prevented from being deformed.

If the protective member comprises a urethane member, then it has a lubricating ability and appropriate levels of mechanical strength and flexibility, and also has a smooth surface for preventing the resin base from being scratched. Since the protective member is highly durable, it is replaced and serviced for maintenance less frequently, and low in cost.

The thickness of the protective member may be smaller as the melting point of the resin workpieces at the locations where the protective member supports the resin workpieces is lower. The resin workpiece which has a low melting point is less vibratable by the protective member which is thinner and the resin workpiece which has a high melting point is more vibratable by the protective member which is thicker. Accordingly, the resin workpieces are vibrated to the extent depending on the melting points thereof.

The thickness of the protective member may be set based on the tilt angle of a contacting surface of the resin base facing to one of the vibratory members at the location where the protective member supports the resin base.

If the thickness of the protective member varies depending on the tilt angle of the contacting surface of the resin base facing to the vibratory member, then the effect of the tilt angle of the resin base in weld portion is reduced for an increased welding quality, and the weld portions having different tilt angles may simultaneously be welded in one process. The thickness of the protective member is independent of the angle at which the protective member lies, and refers to a thickness in a direction normal to the surface of the protective member.

The thickness of the protective member may be defined more properly by a first tilt angle from a direction in which the first vibratory member and the second vibratory member are vibrated relatively to each other and a second tilt angle from a direction perpendicular to the first-mentioned direction.

The vibration welding method may further comprise the steps of holding the resin workpieces in contact with the resin base at least at two locations, the tilt angles of contacting surfaces of the resin base facing to the first vibratory member being different at the two locations, placing the resin base on independent workpiece rests on the first vibratory member, the independent workpiece rests depending on the tilt angles at the two locations, and providing the protective member on ones of the independent workpiece rests which are held in contact with at least a design surface of a product.

The independent workpiece rests depending on the tilt angle do not need to support the entire surface of the resin base, are relatively simple in structure, and have a small supporting area which reduces the amount of material of the protective member.

At least one of the independent workpiece rests may be devoid of the protective member.

The vibration welding method may further comprise the steps of providing a plurality of workpiece rests for supporting a predetermined region of the resin base, the workpiece rests projecting from a surface of the first vibratory member which faces the second vibratory member toward the second vibratory member, providing a plurality of bars for applying a pressure to the resin base and the resin workpieces, the bars projecting toward the first vibratory member from a surface of the second vibratory member which faces the first vibratory member, wherein spacers are insertable at least between the first vibratory member and the workpiece rests, and adjusting the thickness of the spacers to set the position of upper end faces of the workpiece rests.

If the spacers are inserted between the first vibratory member and the workpiece rests, then the thickness of the spacers may be adjusted to set the position of upper end faces of the workpiece rests to control pressures applied to the resin base and the resin workpieces. Specifically, a higher pressure is applied to a region where a thicker spacer is inserted to make the position of the upper end face of a workpiece rest higher, and a lower pressure is applied to a region where a thinner spacer is inserted to make the position of the upper end face of a workpiece rest lower. Therefore, the amount of the material melted in a portion which needs the higher pressure and the amount of the material melted in a portion which needs the lower pressure are equalized to substantially uniformize the degree to which the resin workpieces are welded and the welding strength thereof. Accordingly, the resin base and the resin workpieces are welded into a final product having an excellent appearance.

Consequently, the thicker spacer is inserted in the region where the resin workpiece having the high melting point is joined to the resin base, and the thinner spacer is inserted in the region where the resin workpiece having the low melting point is joined to the resin base, so that the amounts of the resin workpieces melted are substantially equalized. No spacer may be inserted in the region where the resin workpiece having the low melting point is joined to the resin base.

If resin workpieces having the same melting point are simultaneously joined respectively to flat and slanted surfaces of the resin base by vibration welding, then the pressure applied by the vibrating members to the flat surface of the resin base becomes higher than the pressure applied by the vibrating members to the slanted surface of the resin base, and hence the amount of the material melted on the flat surface is greater. If a workpiece rest for supporting the slanted surface is raised by a spacer, then the upper end face of the workpiece rest is elevated to increase the pressure applied to the slanted surface. In this manner, the amounts of the materials melted can be equalized. In other words, the vibration welding method according to the present invention is also applicable to a vibration welding process for joining resin workpieces having the same melting point simultaneously to respective flat and slanted surfaces of the resin base.

Consequently, even if the pressures required are different from each other depending on the portions to be welded, they can be joined in one process. The number of steps of the vibration welding method is not increased, and the time required to obtain the final product is not prolonged.

Since the plural workpiece rests for supporting only regions of the resin base are employed, they can be installed and removed more easily than a single unitary workpiece rest. It is thus very easy to insert the spacers in position. In addition, the thicknesses of the spacers do not need to be set in view of dimensional errors in the resin base and the resin workpieces which are caused when they are manufactured, avoiding the complex trial and error process.

The protective member may be disposed on a product design surface of the resin base. The protective member thus disposed is effective to protect the product design surface against scratch due to the vibration of the vibratory members.

The resin base may be made of polypropylene and the resin workpieces may be made of polypropylene and thermoplastic olefin.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 13 is a map showing appropriate thicknesses of a protective member based on tilt angles $\theta 1$, $\theta 2$;

DESCRIPTION OF THE PREFERRED EMBODIMENTS

Figure 1:
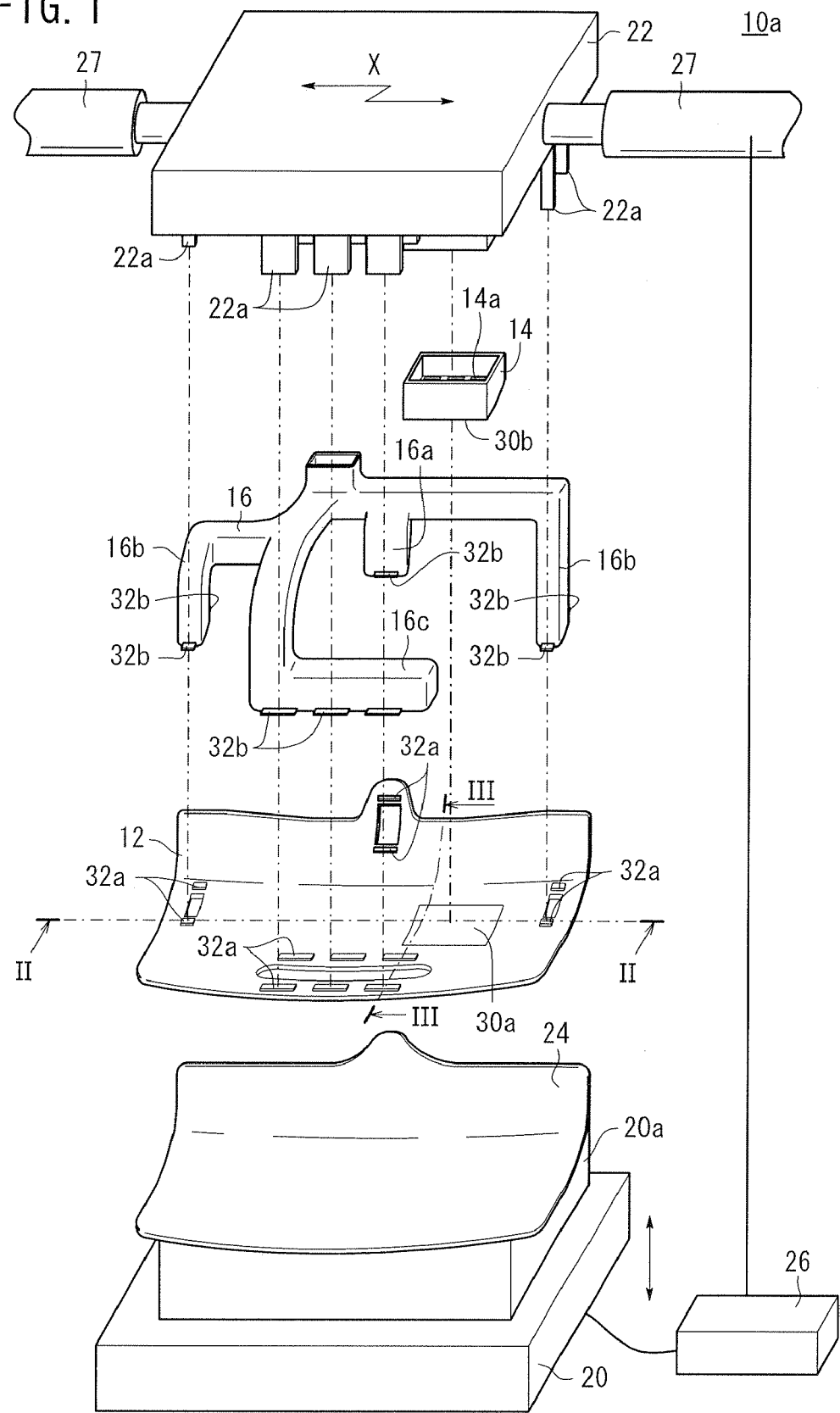
FIG. 1 is an exploded perspective view of a vibration welding apparatus according to a first embodiment of the present invention and workpieces to be joined thereby.

Vibration welding methods and vibration welding apparatus according to preferred embodiments of the present invention will be described in detail below with reference to FIGS. 1 through 19 of the accompanying drawings.

First, a vibration welding method and a vibration welding apparatus 10a (FIG. 1) according to a first embodiment of the present invention will be described below. In the vibration welding method according to the first embodiment, a storage box (resin workpiece) 14 of a front passenger SRS air bag and a duct (resin workpiece) 16 of an air conditioner are joined to an instrument panel (resin base) 12 of an automobile by vibration welding using the vibration welding apparatus 10a.

The instrument panel 12 is made of PP (polypropylene) having a melting point of about 166° C. The storage box 14 is made of TPO (thermoplastic olefin) having a melting point of about 150° C. The duct 16 is made of PP having a melting point of about 166° C. The storage box 14 is relatively pliable whereas the duct 16 is relatively hard.

The duct 16 includes a central air tube 16a, a pair of end air tubes 16b, and a defroster air tube 16c which have respective air passages, not shown, defined therein. Therefore, the duct 16 is in the form of a hollow tube assembly.

Weld members (weld portions) 32b, which are to be joined to weld ribs (weld portions) 32a of the instrument panel 12, are disposed on the respective lower ends of the central air tube 16a, the end air tubes 16b, and the defroster air tube 16c.

The storage box 14 is in the form of a box with an open rear end and has a structure for storing the SRS air bag. The storage box 14 has a bottom panel 14a comprising a coarse mesh and having its bottom joined as a weld member 30b to a weld rib 30a of the instrument panel 12. The bottom panel 14a is hinged so that it can be opened when the SRS air bag is inflated. The weld rib 30a includes a fragile region that can be split open when the SRS air bag is inflated.

As shown in FIG. 1, the vibration welding apparatus 10a includes a base plate 20 as a first vibratory member, a vibrating plate 22 as a second vibratory member, a protective member 24, and a controller 26.

The base plate 20 is a member serving as a base of the vibration welding apparatus 10a and can be lifted away from and lowered toward a floor, not shown, by a plurality of lifters 31 (see FIG. 2) under the control of the controller 26. When the base plate 20 is lifted, it is moved toward the vibrating plate 22. When the base plate 20 is lowered, it is moved away from the vibrating plate 22. The base plate 20 has a workpiece rest 20a for positioning and placing the instrument panel 12 as a workpiece thereon, with the storage box 14 and the duct 16 being placed on the instrument panel 12. The instrument panel 12 is placed on the workpiece rest 20a with its product design surface 12a facing downwardly. The workpiece rest 20a is made of aluminum, for example.

The vibrating plate 22 is disposed over the base plate 20. The vibrating plate 22 has a plurality of pusher bars 22a projecting downwardly for holding the weld members 30b, 32b. When the base plate 20 is elevated toward the vibrating plate 22, the base plate 20 and the pusher bars 22a of the vibrating plate 22 can clamp the weld rib 30a of the instrument panel 12 and the weld member 30b of the storage box 14 as layers therebetween, clamp the weld ribs 32a of the instrument panel 12 and the weld members 32b of the duct 16 as layers therebetween, and apply pressures to those weld ribs and members. The pressures can be controlled by the controller 26.

The vibrating plate 22 can be vibrated laterally with respect to the base plate 20, e.g., horizontal directions X along the longitudinal axis of the instrument panel 12, by the controller 26 and vibrating means 27, thereby vibrating the workpieces. The vibrating plate 22 and the base plate 20 thus serve as a pair of vibratory members which vibrate relatively to each other. The amplitude and frequency with which the vibrating plate 22 is vibrated and the time for which the vibrating plate 22 is vibrated can be controlled by the controller 26.

The protective member 24 is mounted on the workpiece rest 20a, i.e., between the base plate 20 and the instrument panel 12.

The protective member 24 comprises a urethane member having a smooth surface and has a lubricating ability and appropriate levels of mechanical strength and flexibility for supporting the instrument panel 12 appropriately thereon. The protective member 24 is held in contact with the product design surface 12a of the instrument panel 12 for protecting the product design surface 12a against scratch due to the vibration.

Figure 2:
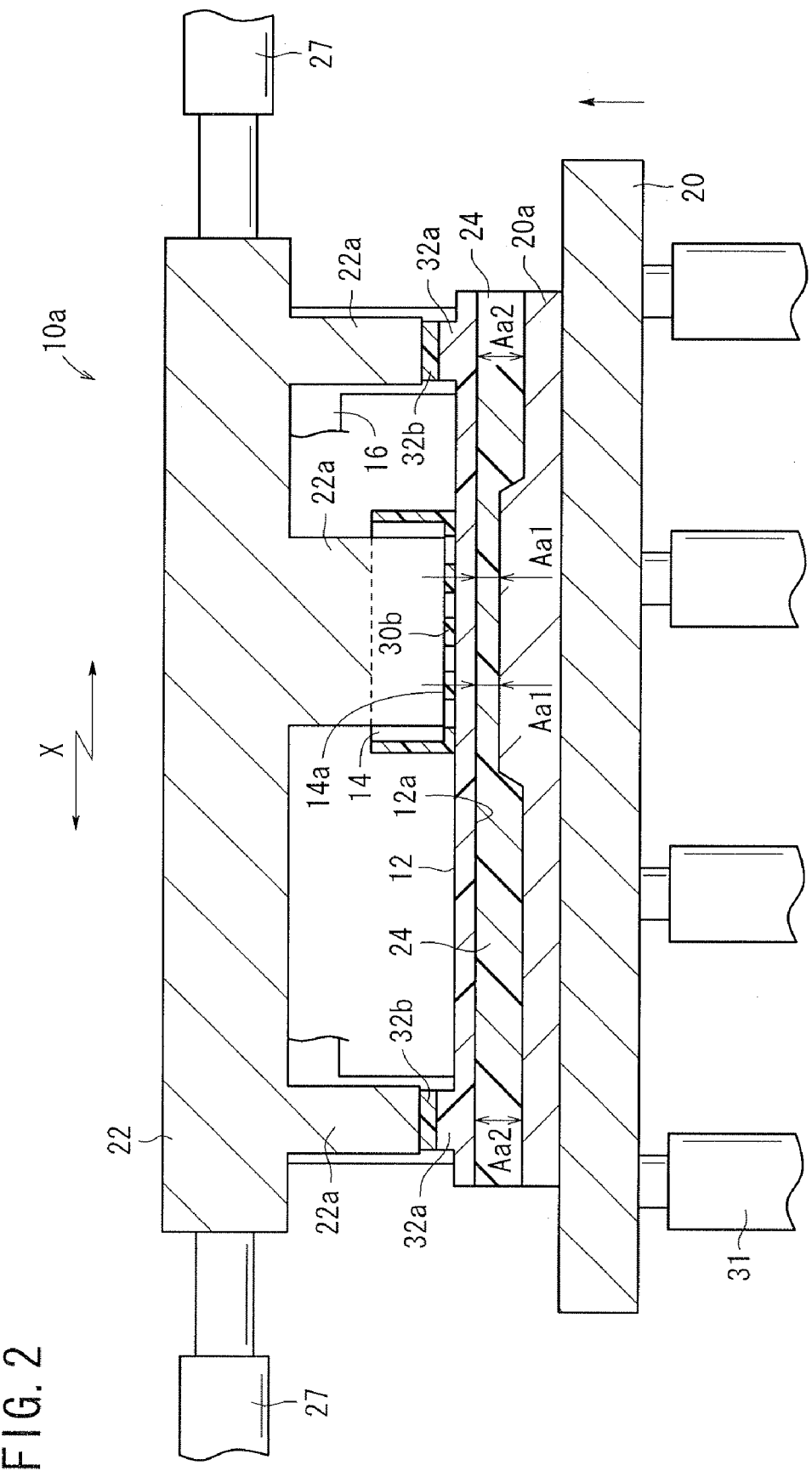
FIG. 2 is a sectional front elevational view, taken alone line II-II of FIG. 1, of the vibration welding apparatus according to the first embodiment with an instrument panel, a storage box, and a duct being clamped thereby.
Figure 3:
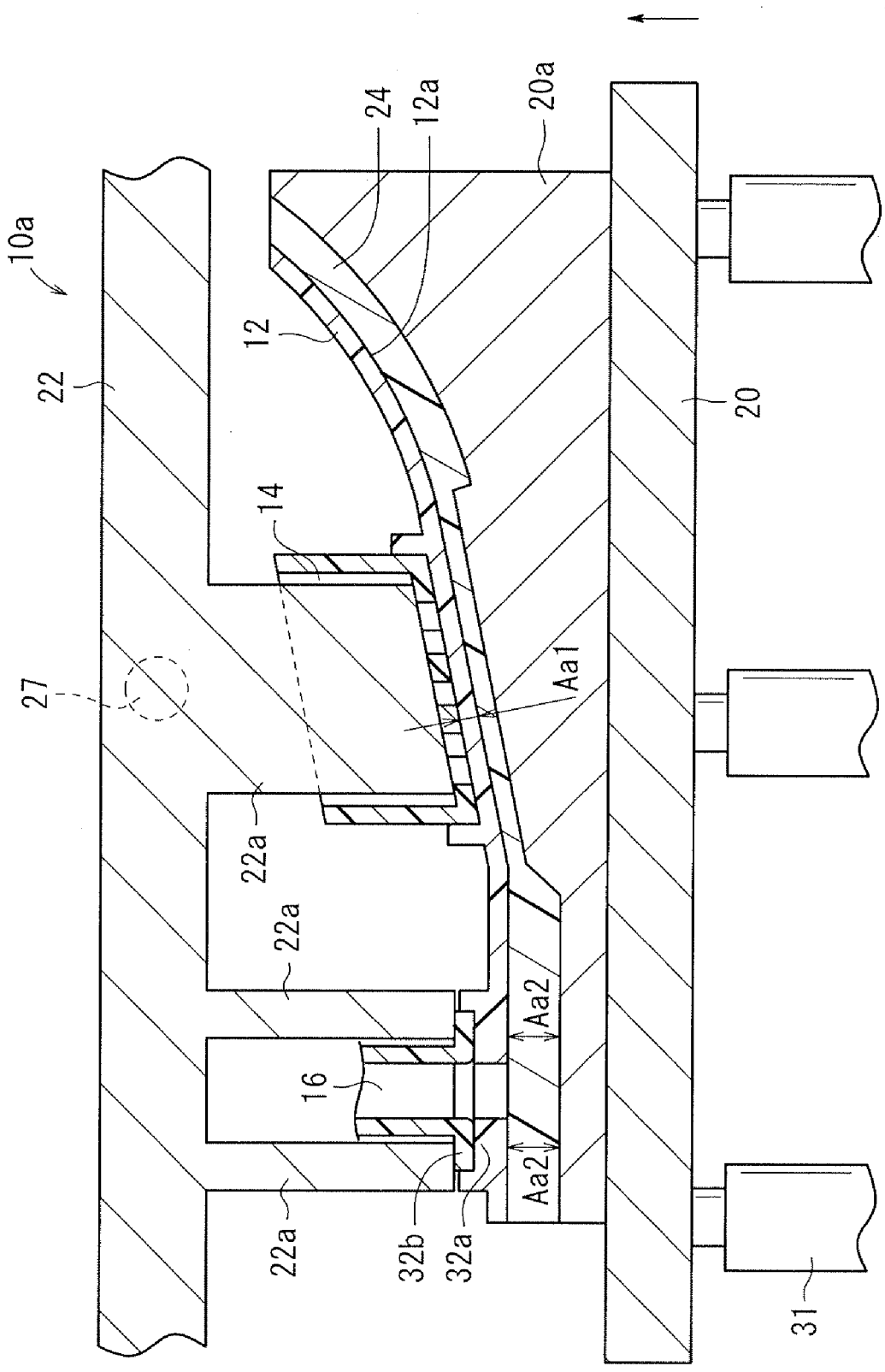
FIG. 3 is a sectional side elevational view of the vibration welding apparatus according to the first embodiment with the instrument panel, the storage box, and the duct being clamped thereby.

As shown in FIGS. 2 and 3, the protective member 24 has a thickness that varies depending on the material of the resin workpiece, i.e., the storage box 14 or the duct 16, at a location where it is supported on the protective member 24. The thickness of the protective member 24 is smaller as the material of the resin workpiece at a location where it is supported thereon has a lower melting point. Specifically, the protective member 24 has a smaller thickness Aa1 at a location where it supports the storage box 14 made of the material (TPO) having a relatively low melting point, and a greater thickness Aa2 at a location where it supports the duct 16 made of the material (PP) having a relatively high melting point. The protective member 24 may not necessarily be in the form of a single protective layer, but may be in the form of a plurality of protective layers such that the smaller thickness is provided by a single protective layer and the greater thickness is provided by a plurality of protective layers. If the protective member 24 comprises a plurality of protective layers, the protective layers may not necessarily be made of one material.

The protective member 24 may also have its thickness varying depending on the shapes of the workpieces to be welded. Specifically, at the location where the storage box 14 is welded to the instrument panel 12, the instrument panel 12 has the fragile region that can be split open when the SRS air bag is inflated. Since the instrument panel 12 should not be excessively vibrated at the location, the protective member 24 at the location has a smaller thickness to reduce the vibration applied to the instrument panel 12.

The protective member 24 has its entire upper surface made smooth to fit snugly against the product design surface 12a of the instrument panel 12. The thickness of the protective member 24 is adjusted by the height of the workpiece rest 20a.

A vibration welding method for jointing the storage box 14 and the duct 16 to the instrument panel 12 by way of vibration welding using the vibration welding apparatus 10a thus constructed will be described below.

In a preparatory process, the instrument panel 12 is positioned and placed on the workpiece rest 20a. As the protective member 24 is mounted on the upper surface of the workpiece rest 20a, the instrument panel 12 is placed on the workpiece rest 20a with the protective member 24 interposed therebetween.

Then, the storage box 14 and the duct 16 are positioned and placed on the instrument panel 12. Alternatively, before the instrument panel 12 is placed on the workpiece rest 20a, the storage box 14 and the duct 16 may be positioned on and provisionally secured to the instrument panel 12, and then the instrument panel 12 may be placed on the workpiece rest 20a.

The base plate 20 is lifted by the lifters 31 under the control of the controller 26. The base plate 20 and the pusher bars 22a of the vibrating plate 22 clamp the weld rib 30a of the instrument panel 12 and the weld member 30b of the storage box 14 as layers therebetween, clamp the weld ribs 32a of the instrument panel 12 and the weld members 32b of the duct 16 as layers therebetween, and apply pressures to those weld ribs and members. Different pressures depending on the thickness of the protective member 24 are applied to contacting surfaces of the weld rib 30a and the weld member 30b and also contacting surfaces of the weld ribs 32a and the weld members 32b. The pusher bars 22a are made of aluminum, for example.

Then, the vibrating plate 22 is vibrated laterally in the horizontal directions X with given amplitude and frequency by the vibrating means 27 under the control of the controller 26. When the vibrating plate 22 is thus vibrated, the contacting surfaces of the weld rib 30a and the weld member 30b and the contacting surfaces of the weld ribs 32a and the weld members 32b generate frictional heat, and are joined together by vibration welding.

After the vibrating plate 22 has been vibrated for a given period of time, or after given amounts of the materials of the weld ribs 30a, 32a and the weld members 30b, 32b are melted, the vibration of the vibrating plate 22 is stopped. The lifters 31 are actuated to lower the base plate 20, and the instrument panel 12, the storage box 14, and the duct 16 that have been joined together is removed as a welded product. In the welded product, the weld members 30b, 32b of the storage box 14 and the duct 16 are sufficiently melted into the instrument panel 12 for a sufficient level of welding strength. However, the vibration welding apparatus 10a prevents the weld members 30b, 32b of the storage box 14 and the duct 16 from being melted to excessive depths, so that the product design surface 12a of the instrument panel 12 will not be deformed.

The vibration welding apparatus 10a is capable of welding the storage box 14 and the duct 16, which are made of different materials, to the instrument panel 12 in one process. Therefore, the vibration welding method carried out by the vibration welding apparatus 10a is highly efficient.

As described above, the protective member 24 comprises a urethane member having a smooth surface and has a lubricating ability and appropriate levels of mechanical strength and flexibility. Since the protective member 24 protects the product design surface 12a of the instrument panel 12, the product design surface 12a is prevented from being scratched when the vibrating plate 22 is vibrated.

Figure 4:
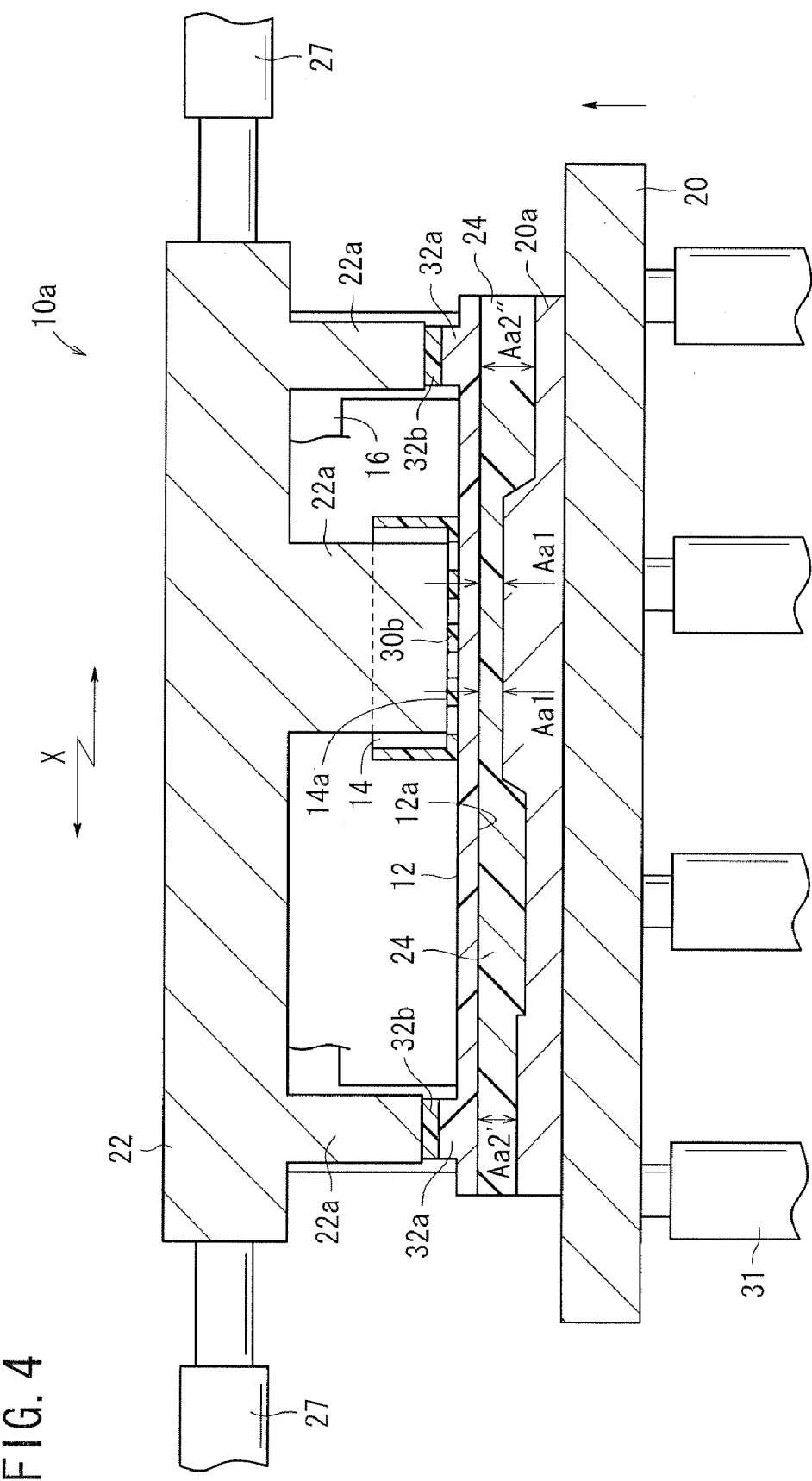
FIG. 4 is a cross-sectional view of the vibration welding apparatus according to the first embodiment using a protective member whose thickness is adjusted depending on locations where the instrument panel, the storage box, and the duct are clamped.

The thickness Aa2 of the protective member 24 remains the same at the locations where the central air tube 16a, the end air tubes 16b, and the defroster air tube 16c of the duct 16 are supported. However, identical frictional forces may not be produced on the contacting surfaces for various reasons even though the thickness Aa2 of the protective member 24 is the same at those locations. As shown in FIG. 4, the protective member 24 may have different thicknesses Aa2', As2" at those locations where the resin workpiece (the duct 16) of the same material is supported.

Figure 5:
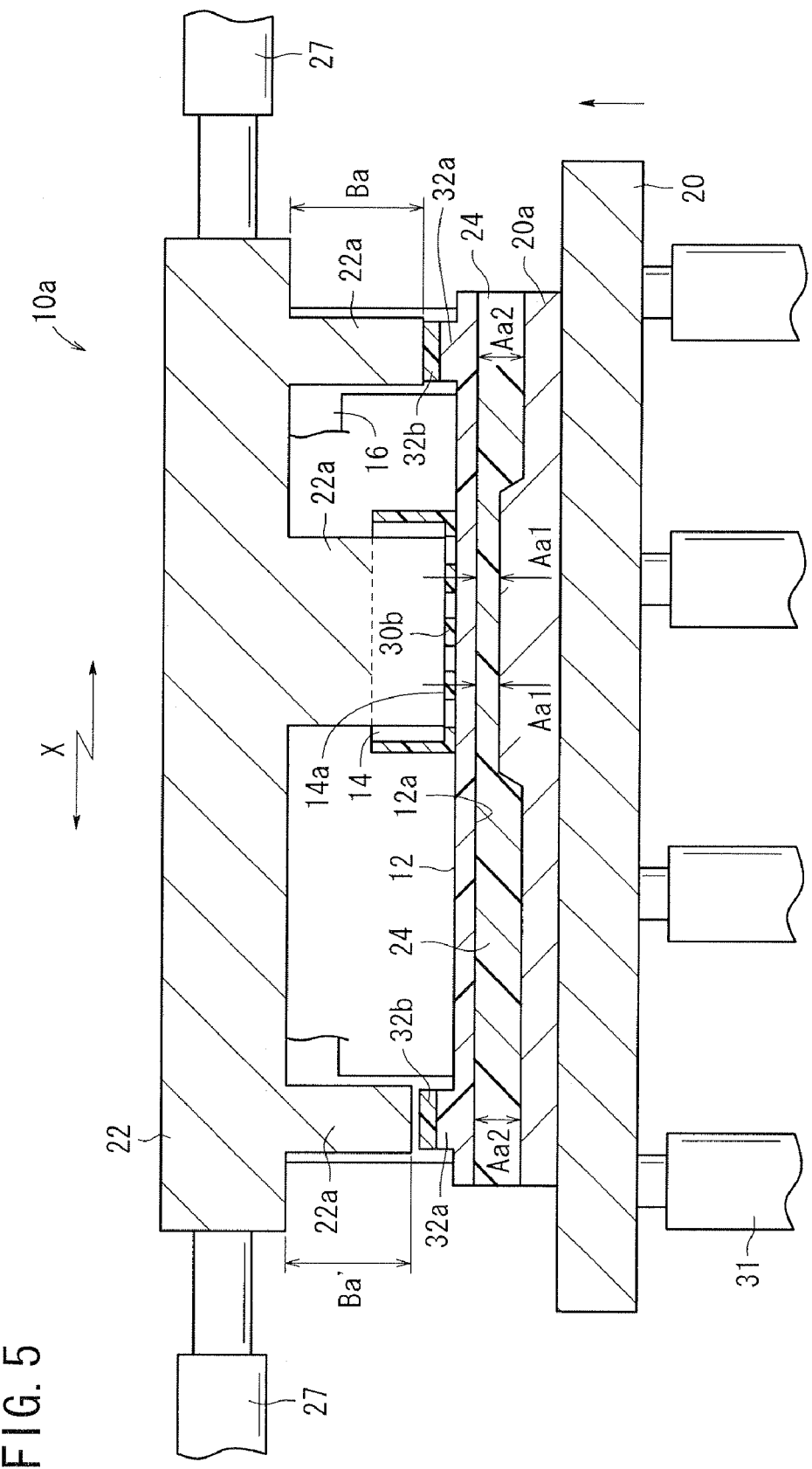
FIG. 5 is a cross-sectional view of the vibration welding apparatus according to the first embodiment using pusher bars whose length is adjusted depending on locations where the instrument panel, the storage box, and the duct are clamped.

According to the vibration welding method described above, when the base plate 20 is lifted, the pusher bars 22a are simultaneously brought into contact with the upper surface of the weld members 30b, 32b of the storage box 14 and the duct 16, applying the same pressure to the weld members 30b, 32b. However, suitable frictional forces may not be produced on the contacting surfaces for various reasons even though the same pressure is applied to the weld members 30b, 32b. As shown in FIG. 5, the pusher bars 22a may have different lengths Ba, Ba' to apply different pressures to the weld members 30b, 32b. In FIG. 5, the length Ba' is slightly smaller than the length Ba, so that the pusher bar 22a having the smaller length Ba' contacts the corresponding weld member 32b slightly later than the pusher bar 22a having the greater length Ba contacts the corresponding weld member 32b.

Figure 6:
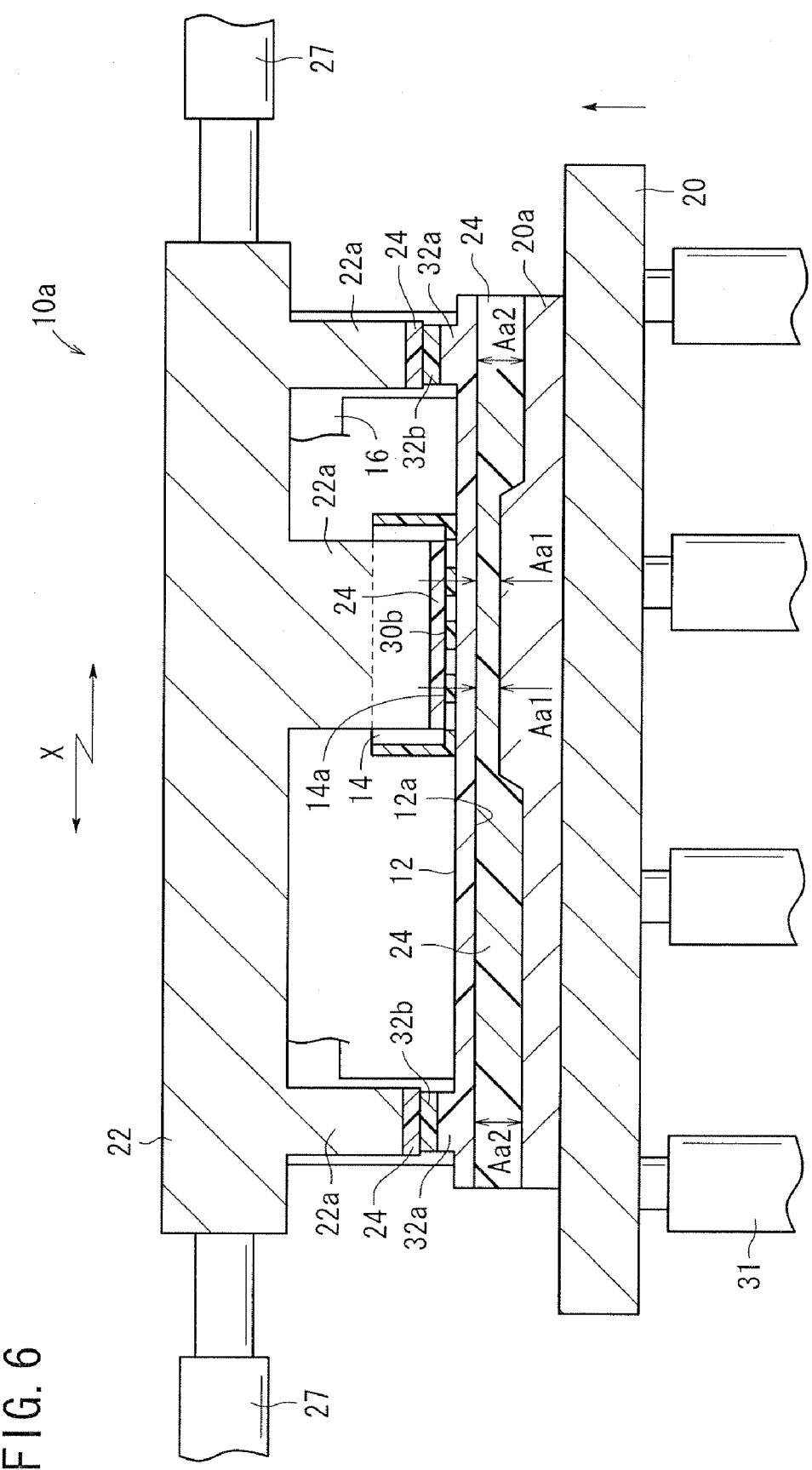
FIG. 6 is a cross-sectional view of the vibration welding apparatus according to the first embodiment which includes protective members on resin workpieces.

In the above illustrated vibration welding apparatus 10a, the protective member 24 is disposed only on the instrument panel 12. Depending on design conditions, as shown in FIG. 6, protective members 24 may also be disposed on the storage box 14 and the duct 16. If the protective members 24 are disposed on the storage box 14 and the duct 16, then the protective member 24 on the instrument panel 12 may be dispensed with.

Figure 7:
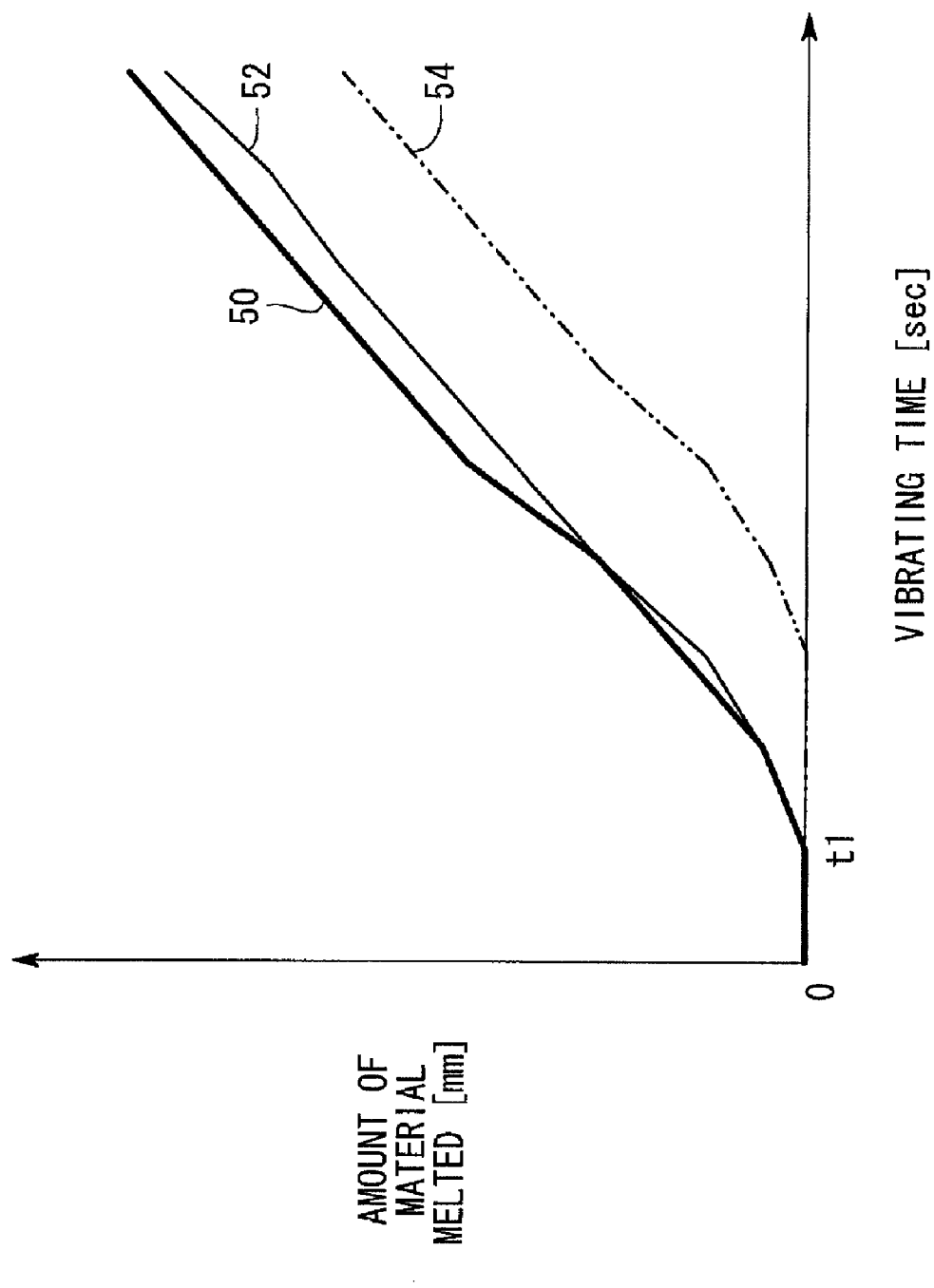
FIG. 7 is a graph of measured amounts of materials melted in welded portions.

FIG. 7 shows measured amounts of materials melted in the vibration welding apparatus 10a at the time the vibration welding method according to the first embodiment was carried out. In FIG. 7, a solid-line curve 50 represents amounts of materials melted from the weld member 30b of the storage box 14 and the weld rib 30a of the instrument panel 12, and a solid-line curve 52 represents amounts of materials melted from the weld members 32b of the duct 16 and the weld ribs 32a of the instrument panel 12. It can be seen from the curves 50, 52 that the materials of the weld members 30b, 32b and the weld ribs 30a, 32a started to melt at time t1 after vibration start time to and continued to melt at substantially the same rate. In FIG. 7, a two-dot-and-dash-line curve 54 represents amounts of materials melted from the weld members 32b of the duct 16 and the weld ribs 32a of the instrument panel 12 at the time the protective member 24 had a constant thickness in a comparative example. It can be understood from the curve 54 that the materials of the duct started to melt at a later time, and the final amounts of the materials melted are smaller.

With the vibration welding apparatus 10a and the vibration welding method carried out thereby, as described above, the resin workpieces, i.e., the storage box 14 and the duct 16, made of different materials can simultaneously be welded to the instrument panel 12 in one process while preventing the instrument panel 12 from being deformed. Resin workpieces made of three or more different materials may be welded to the instrument panel 12 in one process.

A vibration welding method and a vibration welding apparatus 10b (FIG. 8) according to a second embodiment of the present invention will be described below. Those parts of the vibration welding apparatus 10b according to the second embodiment which are identical to those of the vibration welding apparatus 10a according to the first embodiment are denoted by identical reference characters, and will not be described in detail below.

Figure 8:
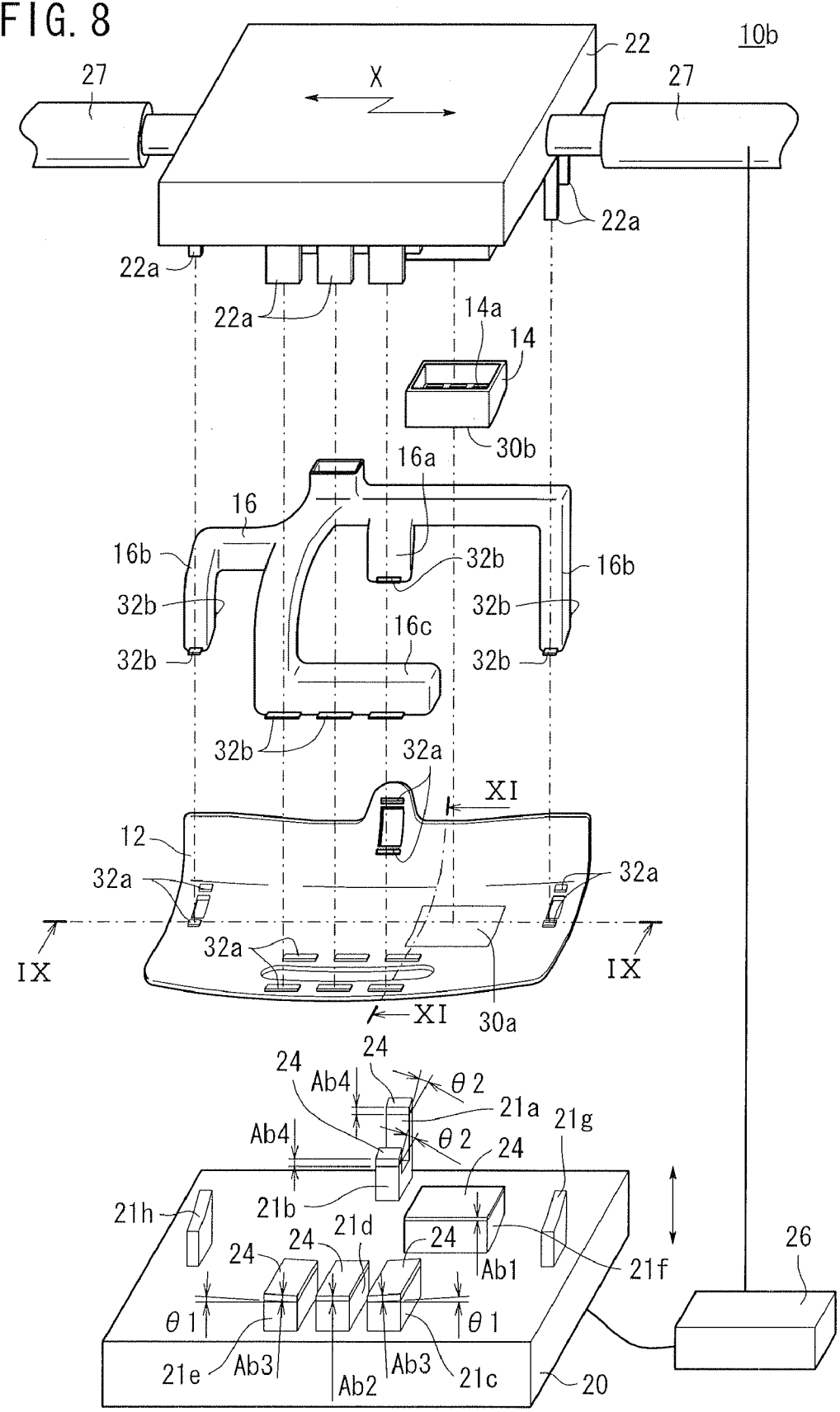
FIG. 8 is an exploded perspective view of a vibration welding apparatus according to a second embodiment of the present invention and workpieces to be joined thereby.
Figure 9:
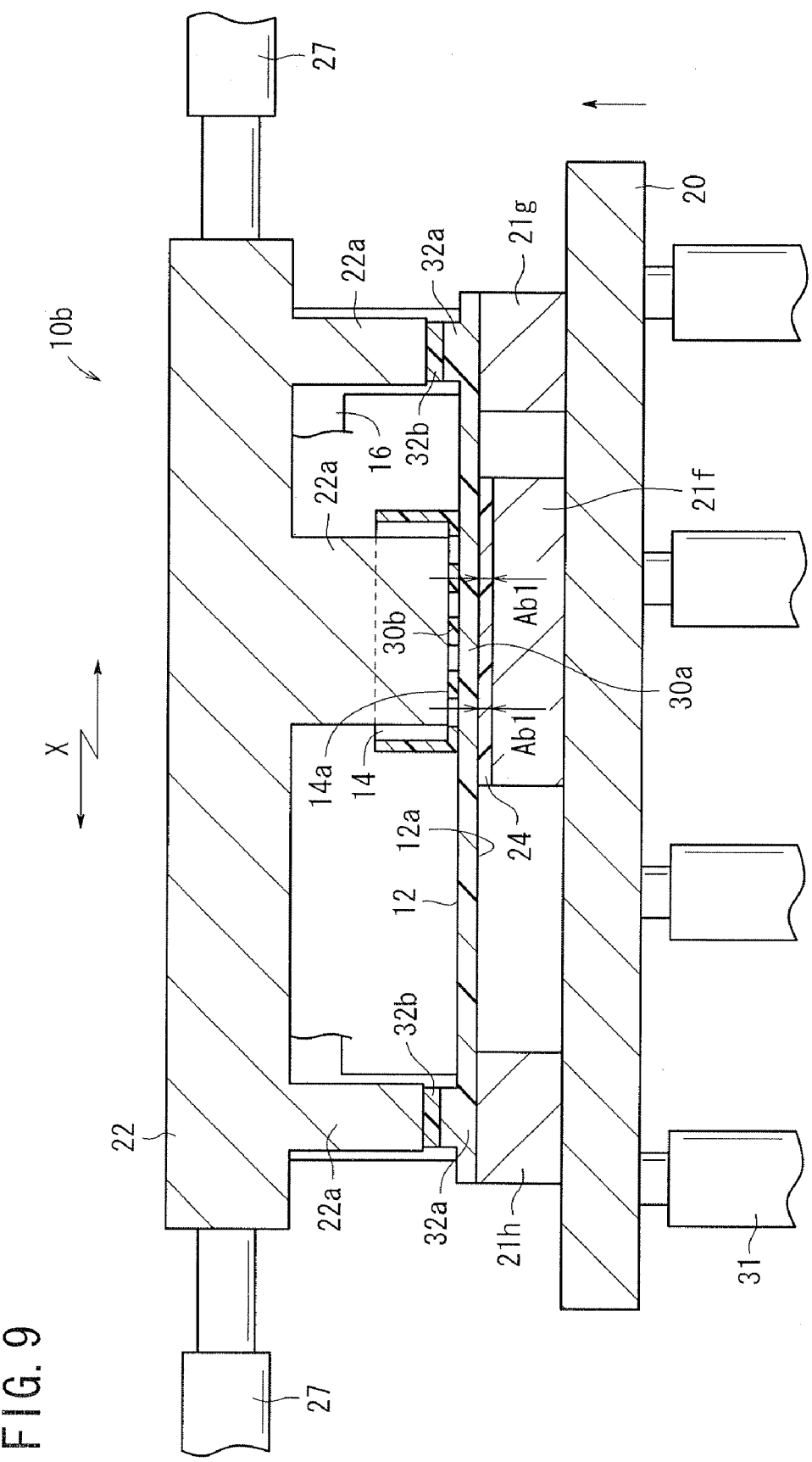
FIG. 9 is a sectional front elevational view, taken alone line IX-IX of FIG. 8, of the vibration welding apparatus according to the second embodiment with an instrument panel, a storage box, and a duct being clamped thereby.
Figure 10:
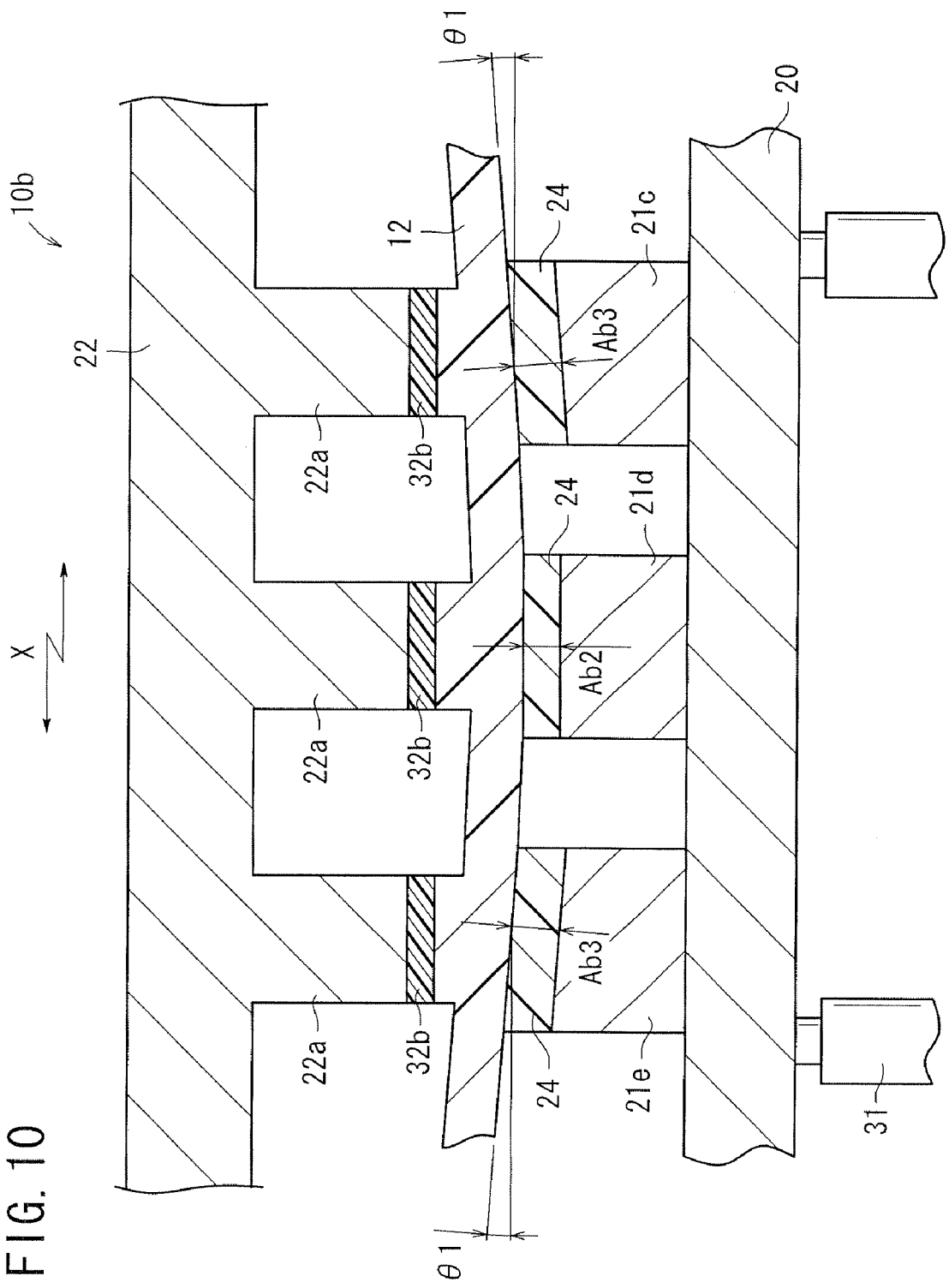
FIG. 10 is an enlarged fragmentary sectional front elevational view of the vibration welding apparatus according to the second embodiment with the instrument panel and the duct being clamped thereby.
Figure 11:
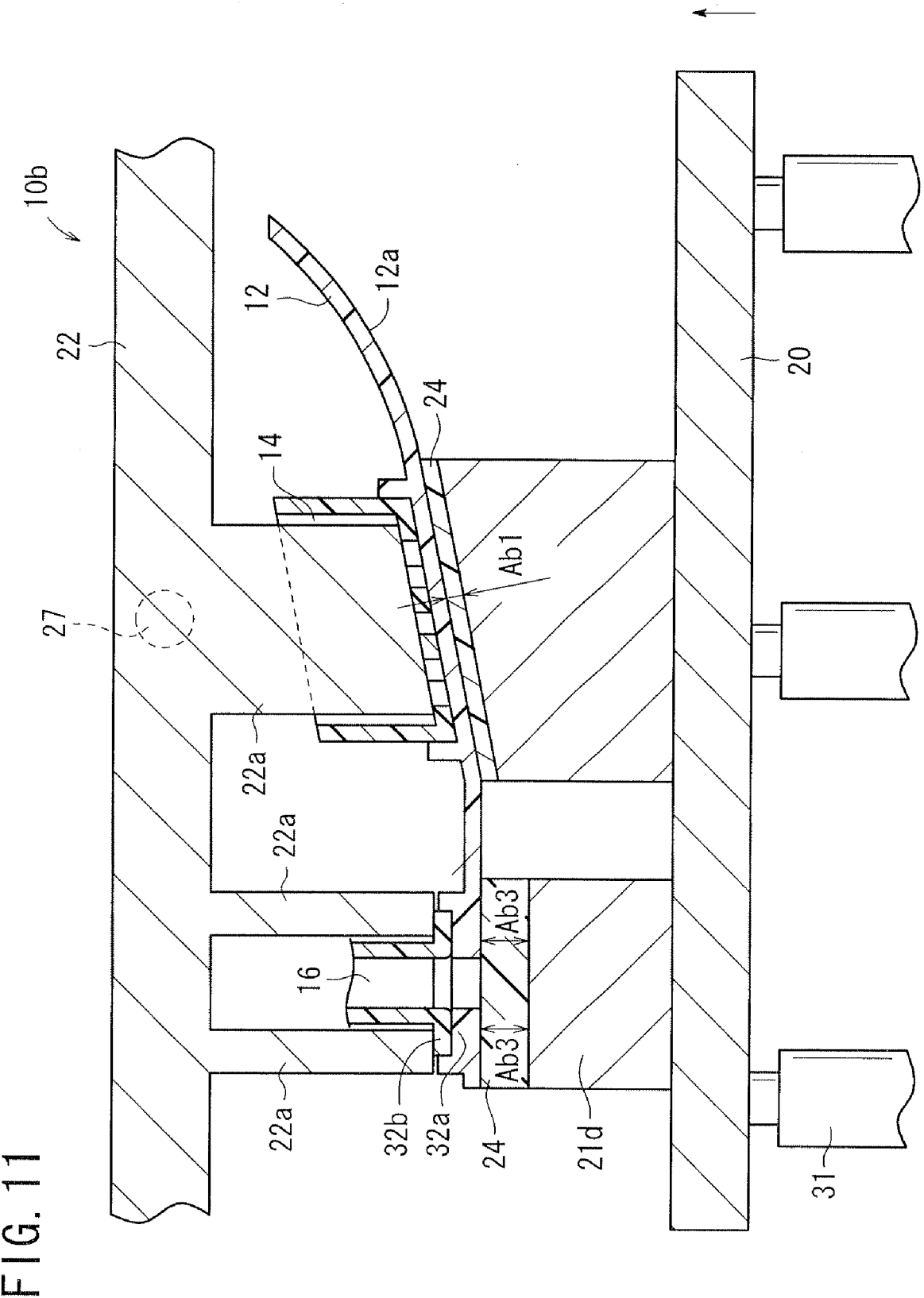
FIG. 11 is a sectional side elevational view, taken alone line XI-XI of FIG. 8, of the vibration welding apparatus according to the second embodiment with the instrument panel, the storage box, and the duct being clamped thereby.

The vibration welding method according to the second embodiment is carried out using the vibration welding apparatus 10b shown in FIG. 8.

The instrument panel 12 has a complex curved surface and a considerably wide area. It is assumed that an angle (first tilt angle) from the directions X in which the vibrating plate 22 is vibrated is referred to as θ1, and an angle (second tilt angle) from directions perpendicular to the directions X is referred to as θ2.

The base plate 20 has a plurality of independent workpiece rests 21a through 21h spaced from each other for positioning and placing the instrument panel 12 as a workpiece thereon, with the storage box 14 and the duct 16 being placed on the instrument panel 12. The instrument panel 12 is placed on the workpiece rests 21a through 21h with its product design surface 12a facing downwardly. The workpiece rests 21a through 21h are made of aluminum, for example.

The workpiece rests 21a, 21b also support two weld members 32b of the central air tube 16a. The two weld members 32b of the central air tube 16a are slightly spaced from each other in a transverse direction perpendicular to the directions X, and are supported respectively by the independent workpiece rests 21a, 21b. The positions of the workpiece rests 21a, 21b with respect to the instrument panel 12 correspond to a front lower portion of the instrument panel 12 as it is oriented when used as a final product. The workpiece rests 21a, 21b have their respective upper surfaces for supporting the weld members 32b thereon, the upper surfaces being inclined through large angles θ2.

The workpiece rests 21c through 21e support respective three pairs of welded members 32b of the defroster air tube 16c with the instrument panel 12 interposed therebetween. The three pairs of welded members 32b of the defroster air tube 16c have respective upper surfaces for supporting the instrument panel 12 thereon, the upper surfaces being inclined through different angles θ1. Specifically, as shown in FIG. 8, the angle θ1 of the upper surface of the workpiece rest 21c for supporting the right pair of welded members 32b is of a positive value, and the angle θ1 of the upper surface of the workpiece rest 21e for supporting the left pair of welded members 32b is of a negative value. The angle θ1 of the upper surface of the workpiece rest 21d for supporting the central pair of welded members 32b is nil. The three workpiece rests 21c through 21e are employed to provide these different angles θ1.

The workpiece rest 21f supports the storage box 14 with the instrument panel 12 interposed therebetween.

The workpiece rests 21g, 21h support the respective weld members 32b of the left and right end air tubes 16b with the instrument panel 12 interposed therebetween. Front faces of the portions of the instrument panel 12 to which the respective end air tubes 16b are welded will be covered with predetermined air grills and will not be visible when instrument panel 12 is used as a final product.

The protective members 24 are mounted on the respective workpiece rests 21a through 21f, i.e., between the base plate 20 and the instrument panel 12, and are not mounted on the workpiece rests 21g, 21h.

As shown in FIGS. 8, 9, 10, and 11, each protective member 24 has a thickness that varies depending on the material of the resin workpiece, i.e., the storage box 14 or the duct 16, at a location where it is supported on the protective member 24. Specifically, the protective member 24 has a smaller thickness Ab1 at a location where it supports the storage box 14 made of the material (TPO) having a relatively low melting point, and greater thicknesses Ab2, Ab3, Ab4 at locations where it supports the duct 16 made of the material (PP) having a relatively high melting point. The thickness of the protective member 24 is independent on the angle at which the protective member 24 lies, and refers to a thickness in a direction normal to the surface of the protective member 24.

The protective members 24 have their entire upper surface made smooth to fit snugly against the product design surface 12a of the instrument panel 12. The thicknesses of the protective members 24 are adjusted to a range including nil by the height of the workpiece rests 21a through 21h.

The thicknesses of the protective members 24 are set to different values based on the tilt angles θ1, θ2 of the upper surfaces of the workpiece rests 21a through 21e which are held against the instrument panel 12 at different locations where the duct 16 of the material (PP) is supported.

Figure 12:
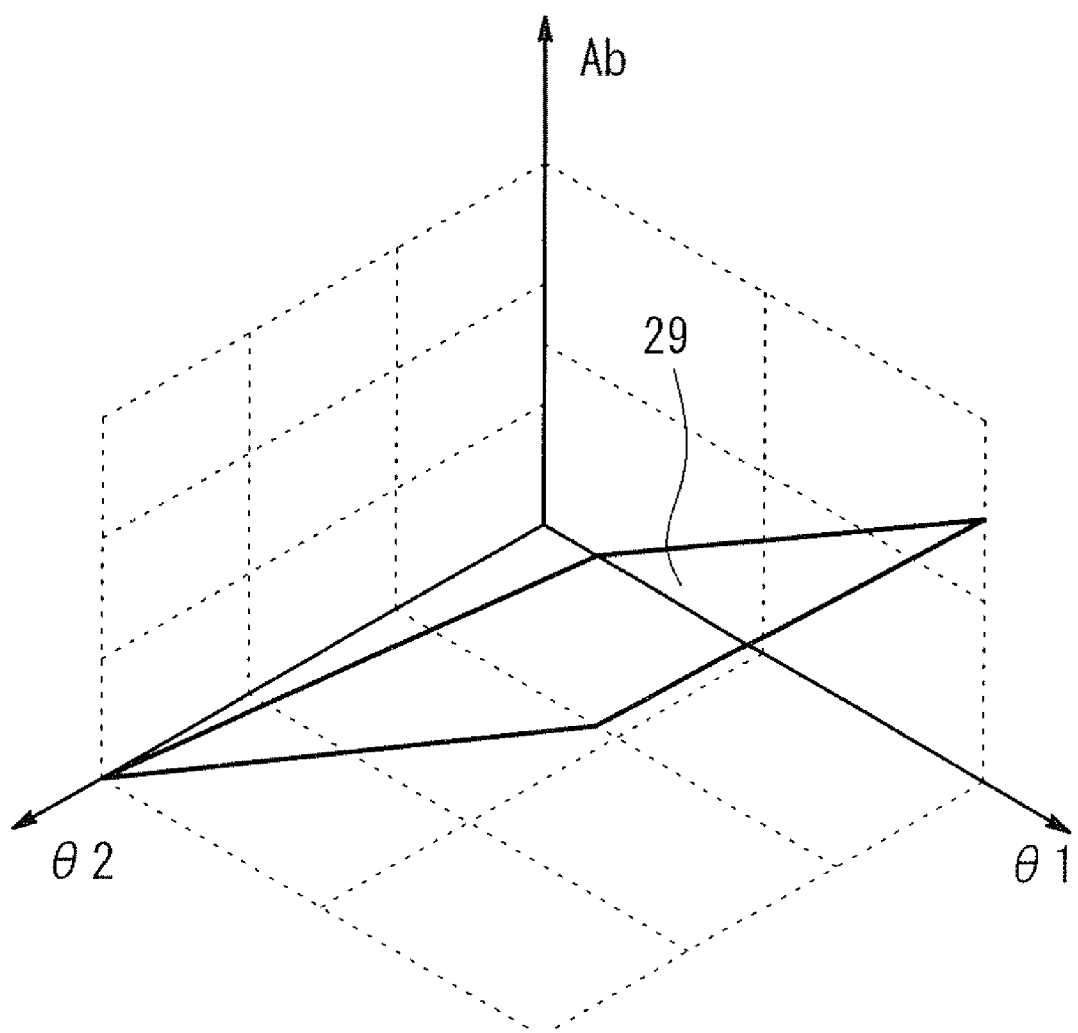
FIG. 12 is a graph showing appropriate thicknesses of a protective member based on tilt angles $\theta 1$, $\theta 2$.

Specifically, as shown in FIG. 12, the thickness Ab of the protective member 24 is of a value depending on a hypothetical surface 29, which may be flat or curved, based on the tilt angle θ1 and the tilt angle θ2. A review of FIG. 12 indicates that as the tilt angle θ1 increases, the thickness Ab increases at a relatively high rate, and as the tilt angle θ2 increases, the thickness Ab increases at a relatively low rate. The surface 29 includes a dead zone where the thickness Ab does not increases if the tilt angles θ1, θ2 are nearly nil. If the tilt angle θ1 is θ1=0, then the thickness Ab is constant regardless of the tilt angle θ2.

The surface 29 shown in FIG. 12 is designed to allow the storage box 14 and the duct 16 to be uniformly welded to the instrument panel 12 by minimizing movements in directions other than the directions X due to the different tilt angles θ1, θ2. The surface 29, or a corresponding equation for calculating the thickness Ab based on the tilt angles θ1, θ2, is determined by experiments, calculations, simulations, or the like. Since the surface 29 can provide values corresponding to the tilt angles θ1, θ2 in two perpendicular directions, the thickness Ab of the protective member 24 can be determined more accurately than if the values were provided based on only one of the angles.

The tilt angles θ1, θ2 shown in FIG. 12 are of absolute values and may represent either positive values or negative values. If the product design surface 12a of the instrument panel 12 comprises a curved surface or a plurality of flat surfaces, then the thickness Ab of the protective member 24 may be set based on average values of the tilt angles θ1, θ2.

According to the surface 29 shown in FIG. 12, the thickness Ab3 and the thickness Ab4 are greater than the thickness Ab2. Though only one of the tilt angles θ1, θ2 is illustrated in FIG. 8 for the workpiece rests 21a, 21b, 21c, 21e, the thickness Ab3 and the thickness Ab4 thereof may be set based on composite angles.

Instead of the surface 29, a corresponding equation for calculating the thickness Ab based on the tilt angles θ1, θ2 or a map for determining the thickness Ab based on the tilt angles θ1, θ2 may be employed. For example, the thickness Ab of the protective member 24 may be set based on a map shown in FIG. 13. The map shown in FIG. 13 is produced by determining vertical thicknesses at the different locations from the thickness of the protective member 24 based on the tilt angles θ1, θ2 and adjusting the vertical thicknesses in view of reactive forces at the different locations. The map shown in FIG. 13 may be generated by calculations, experiments, and empirical values. If the thickness of the protective member 24 is less than 5 mm, then the instrument panel 12 may possibly be deformed. Therefore, the thickness of the protective member 24 has a lower limit of 5 mm.

No protective member 24 is disposed on the workpiece rests 21g, 21h because the locations of the instrument panel 12 where it is supported by the workpiece rests 21g, 21h are concealed by other components when the instrument panel 12 is assembled as a final product in the automobile. Consequently, the amount of material of the protective member 24 is reduced, and hence the amount of work required to replace the protective member 24 is also reduced.

A vibration welding method for jointing the storage box 14 and the duct 16 to the instrument panel 12 by way of vibration welding using the vibration welding apparatus 10b thus constructed will be described below.

In a preparatory process, the instrument panel 12 is positioned and placed on the workpiece rests 21a through 21h. As the protective member 24 is mounted on the upper surfaces of the workpiece rests 21a through 21f, the instrument panel 12 is placed on the workpiece rests 21a through 21f with the protective member 24 interposed therebetween.

Then, the storage box 14 and the duct 16 are positioned and placed on the instrument panel 12. Alternatively, before the instrument panel 12 is placed on the workpiece rests 21a through 21h, the storage box 14 and the duct 16 may be positioned on and provisionally secured to the instrument panel 12, and then the instrument panel 12 may be placed on the workpiece rests 21a through 21h.

The base plate 20 is lifted by the lifters 31 under the control of the controller 26. The base plate 20 and the pusher bars 22a of the vibrating plate 22 clamp the weld rib 30a of the instrument panel 12 and the weld member 30b of the storage box 14 as layers therebetween, clamp the weld ribs 32a of the instrument panel 12 and the weld members 32b of the duct 16 as layers therebetween, and apply pressures to those weld ribs and members. Different pressures depending on the thickness of the protective member 24 are applied to contacting surfaces of the weld rib 30a and the weld member 30b and also contacting surfaces of the weld ribs 32a and the weld members 32b.

Then, the vibrating plate 22 is vibrated laterally in the horizontal directions X with a given amplitude and frequency under the control of the controller 26. When the vibrating plate 22 is thus vibrated, the contacting surfaces of the weld rib 30a and the weld member 30b and the contacting surfaces of the weld ribs 32a and the weld members 32b generate frictional heat, and are joined together by vibration welding.

The appropriate thicknesses Ab2, Ab3, ab4 of the protective member 24 are set based on the tilt angles θ1, θ2 of the contacting surfaces of the workpiece rests 21a through 21e and the instrument panel 12. Therefore, the storage box 14 and the duct 16 are uniformly welded to the instrument panel 12 by minimizing movements in directions other than the directions X due to the different tilt angles θ1, θ2. The welding quality of the welded regions is increased, and any undue loads on the vibration welding apparatus 10b are reduced to give a longer service life thereto.

Figure 14:
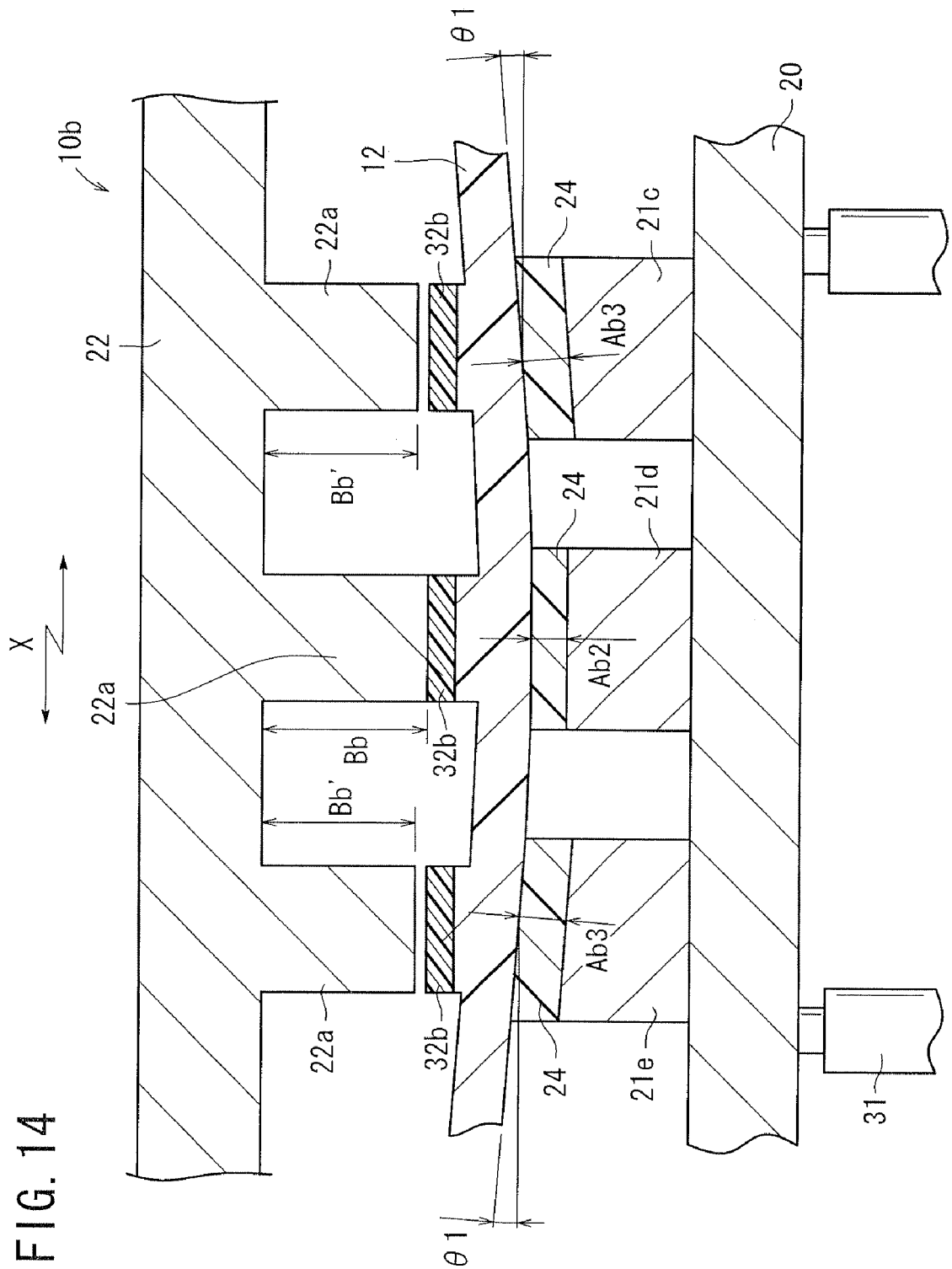
FIG. 14 is a cross-sectional view of the vibration welding apparatus according to the second embodiment using pusher bars whose length is adjusted depending on locations where the instrument panel, the storage box, and the duct are clamped.

According to the vibration welding method described above, when the base plate 20 is lifted, the pusher bars 22a are simultaneously brought into contact with the upper surface of the weld members 30b, 32b of the storage box 14 and the duct 16, applying the same pressure to the weld members 30b, 32b. However, suitable frictional forces may not be produced on the contacting surfaces for various reasons even though the same pressure is applied to the weld members 30b, 32b. As shown in FIG. 14, the pusher bars 22a may have different lengths Bb, Bb' to adjust pressures applied to the weld members 30b, 32b. In FIG. 14, the length Bb' is slightly smaller than the length Bb, so that the pusher bar 22a having the smaller length Bb' contacts the corresponding weld member 32b slightly later than the pusher bar 22a having the greater length Bb contacts the corresponding weld member 32b.

Figure 15:
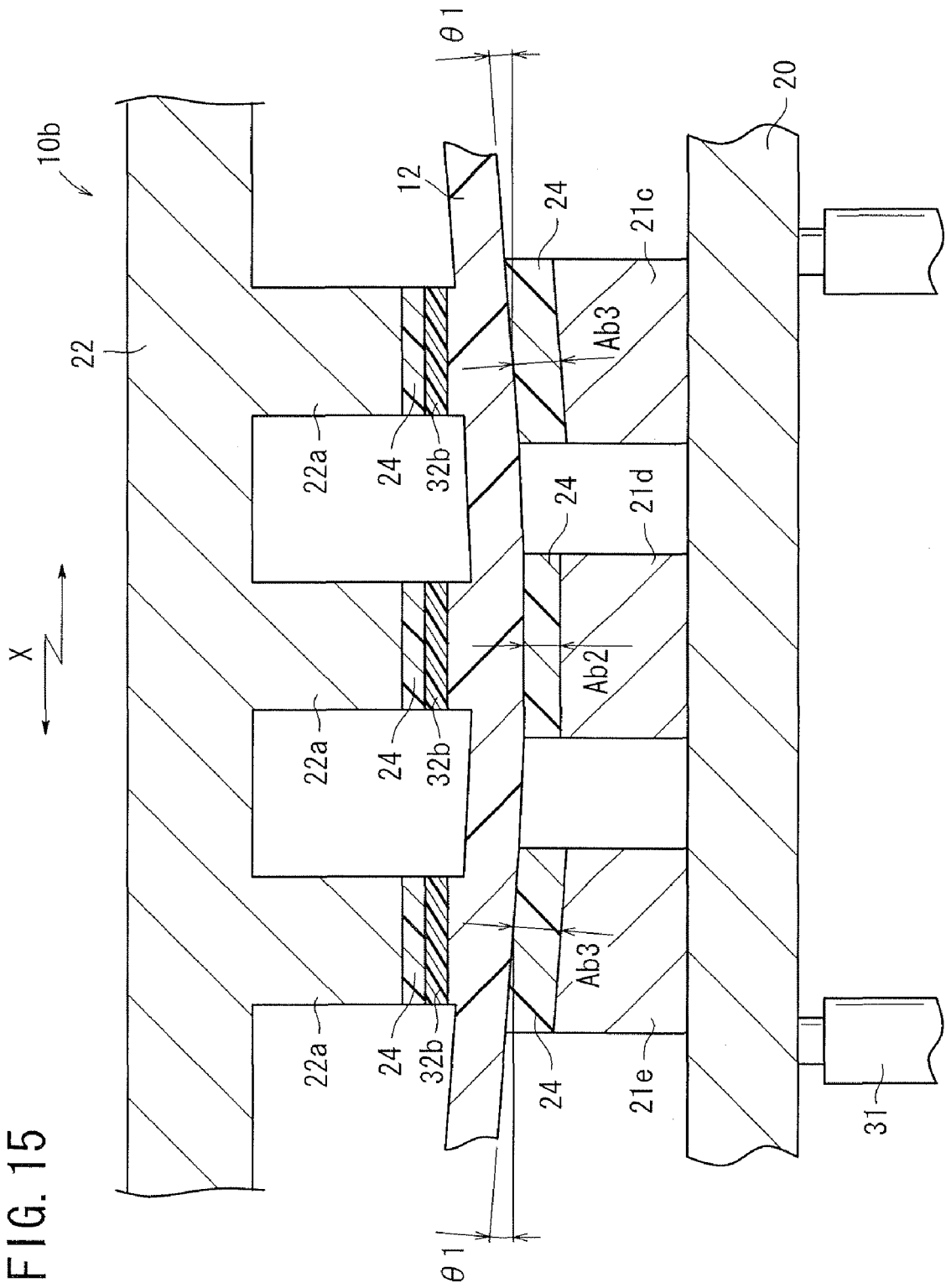
FIG. 15 is a cross-sectional view of the vibration welding apparatus according to the second embodiment which includes protective members on resin workpieces.

In the above illustrated vibration welding apparatus 10b, the protective member 24 is disposed only on the instrument panel 12. Depending on design conditions, as shown in FIG. 15, protective members 24 may also be disposed on the storage box 14 and the duct 16. If the protective members 24 are disposed on the storage box 14 and the duct 16, then the protective member 24 on the instrument panel 12 may be omitted.

With the vibration welding apparatus 10b and the vibration welding method according to the second embodiment, the appropriate thicknesses Ab2, Ab3, Ab4 of the protective member 24 are set based on the tilt angles θ1, θ2 of the contacting surfaces of the workpiece rests 21a through 21e and the instrument panel 12. Therefore, the storage box 14 and the duct 16 are uniformly welded to the instrument panel 12 by minimizing movements in directions other than the directions X due to the different tilt angles θ1, θ2. The welding quality of the welded regions is increased, and any undue loads on the vibration welding apparatus 10b and loads in non-vibrating directions are reduced to give a longer service life thereto.

Even though the tilt angles θ1, θ2 are different, the storage box 14 and the duct 16 are welded to the instrument panel 12 in one process by the vibration welding apparatus 10b. Consequently, the vibration welding apparatus 10b is relatively low in cost, and the vibration welding method carried out thereby has a relatively small number of steps and hence is efficient.

Since the duct 16 has the plural weld members 32b, it is convenient and efficient to weld the duct 16 to the instrument panel 12 in one process.

With the vibration welding apparatus 10b and the vibration welding method according to the second embodiment, furthermore, even though the instrument panel 12 has a considerably wide area, it does not need to be supported over its entire surface because of the independent workpiece rests 21a through 21f corresponding to the tilt angles θ1, θ2. The vibration welding apparatus 10b is thus relatively simple in structure, has a small supporting area for supporting the instrument panel 12, and requires a small amount of material of protective member 24. The independent workpiece rests 21a through 21f have independent surfaces for contacting the instrument panel 12. Some of the workpiece rests, e.g., the workpiece rests 21a, 21b, may have a common base (see FIG. 8).

Though the instrument panel 12 has a complex curved surface, the upper surfaces of the workpiece rests 21a through 21f have a small area and can be approximated as flat surfaces. Accordingly, the thicknesses Ab of the protective members 24 can easily be set, and the protective members 24 for use on the workpiece rests 21a through 21f may have a uniform thickness. The upper surfaces of the workpiece rests 21a through 21f may be flat. The workpiece rests 21a through 21g may individually be designed, manufactured, adjusted, and serviced for maintenance.

A vibration welding method and a vibration welding apparatus 10c (FIGS. 16 and 17) according to a third embodiment of the present invention will be described below. Those parts of the vibration welding apparatus 10c according to the third embodiment which are identical to those of the vibration welding apparatus 10a according to the first second embodiment are denoted by identical reference characters, and will not be described in detail below.

Figure 16:
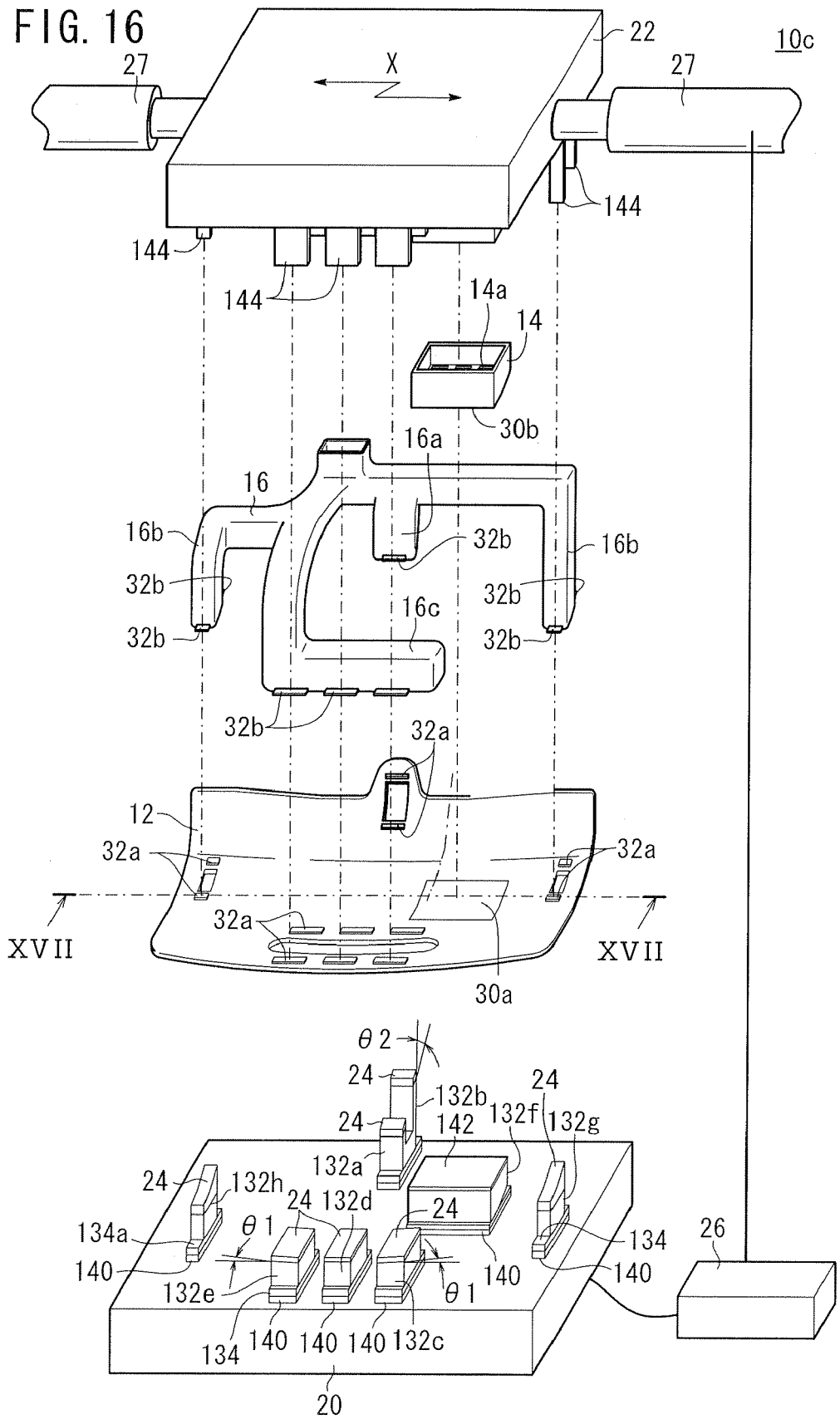
FIG. 16 is an exploded perspective view of a vibration welding apparatus according to a third embodiment of the present invention and workpieces to be joined thereby.
Figure 17:
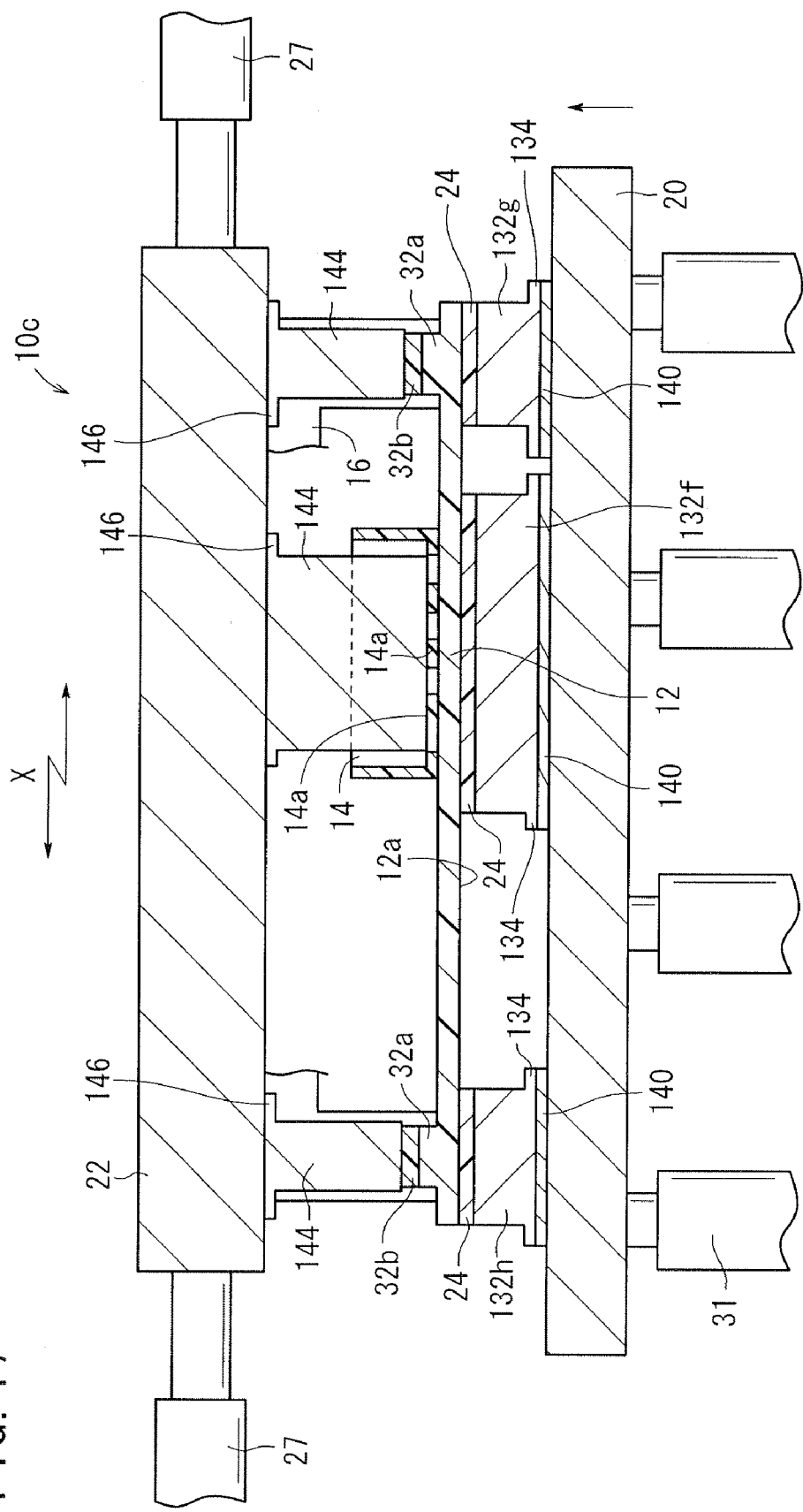
FIG. 17 is a sectional front elevational view, taken alone line XVII-XVII of FIG. 16, of the vibration welding apparatus according to the third embodiment with an instrument panel, a storage box, and a duct being clamped thereby.

The vibration welding method according to the third embodiment is carried out using the vibration welding apparatus 10c shown in FIG. 16.

As shown in FIG. 16, the instrument panel 12 has a complex curved surface and a considerably wide area.

The base plate 20 has a plurality of workpiece rests 132a through 132h spaced from each other for supporting given regions of the instrument panel 12. The workpiece rests 132a through 132h extend toward the vibrating plate 22. The workpiece rests 132a through 132h are made of aluminum, for example. The workpiece rests 132a through 132h correspond to the workpiece rests 21a through 21h according to the second embodiment described above.

Figure 18:
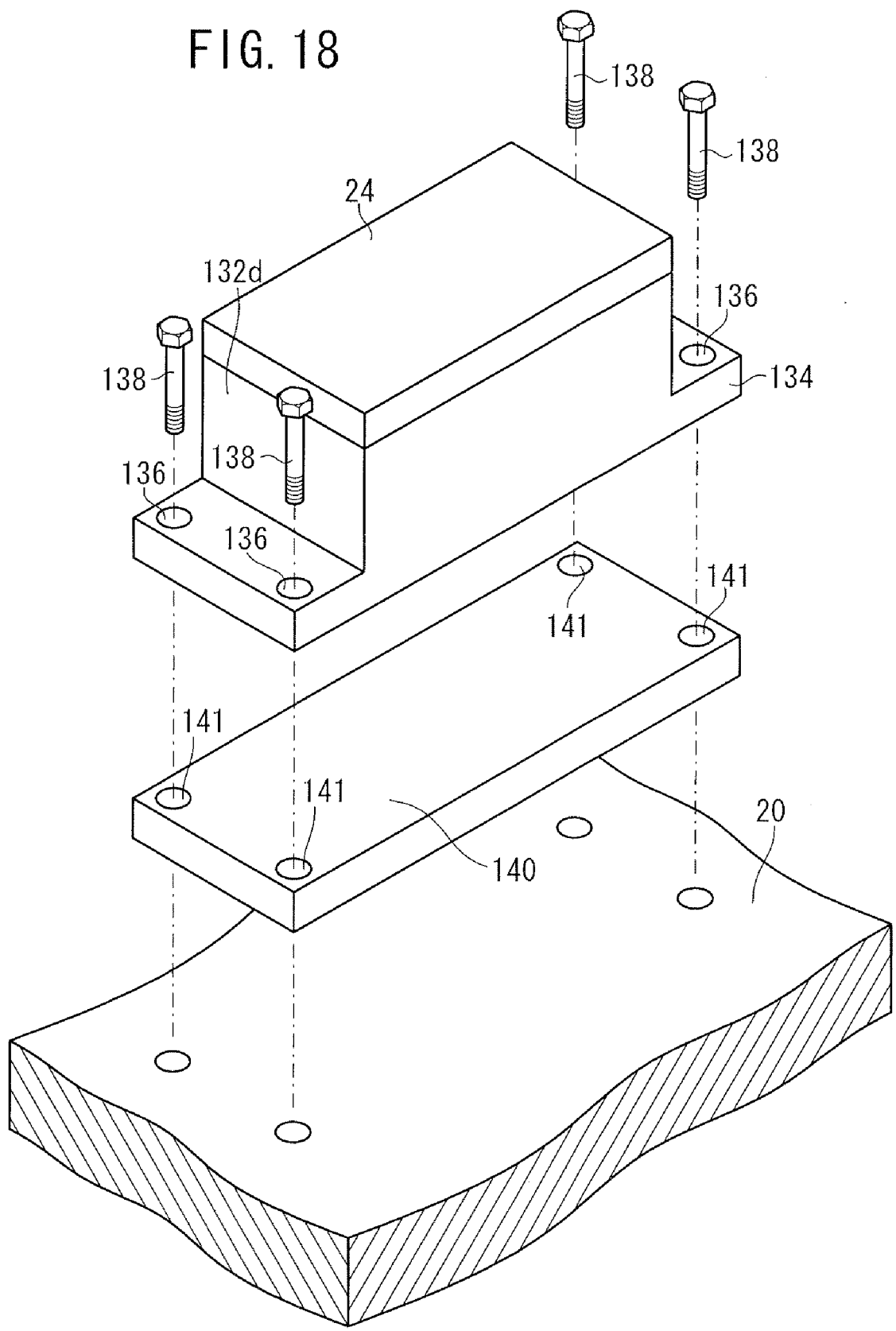
FIG. 18 is an enlarged exploded perspective view of a workpiece rest.

FIG. 18 shows the workpiece rest 132d as an example. As shown in FIG. 18, the workpiece rest 132d has a wider wing 134 on its lower end which projects laterally from opposite sides thereof. The wider wing 134 has screw holes 136 defined therein. The workpiece rest 132d is fastened to the base plate 20 by screws 138 extending through the screw holes 136 and threaded into the base plate 20.

A shim 140 is interposed as a spacer between the wider wing 134 and the base plate 20. The shim 140 has essentially the same dimensions as the wider wing 134 and has screw holes 141 defined therein which are aligned with the respective screw holes 136. The shim 140 is also fastened to the base plate 20 by the screws 138.

The shim 140 may be made of structural steel, e.g., SC 50, or tool steel, e.g., SK 5, according to the JIS.

The workpiece rests 132a through 132c and 132e through 132h are structurally identical to the workpiece rest 132d.

The shims 140 combined with the workpiece rests 132a through 132h have thicknesses that vary depending on the locations where the workpiece rests 132a through 132h support the resin workpieces. Specifically, the shim 140 has a smaller thickness at the workpiece rest 132f which supports the storage box 14 made of the material (TPO) having a relatively low melting point, and a greater thickness at the workpiece rests 132a through 132e, 132g, 132h which support the duct 16 made of the material (PP) having a relatively high melting point. The different thicknesses of the shims 140 are effective to adjust the positions of the upper surfaces of the workpiece rests 132a through 132h.

It is not necessary for each of the workpiece rests 132a through 132h to be combined with a single shim 140. If a high pressure is applied to a workpiece rest, then the workpiece rest may be combined with a plurality of shims 140. If a particularly low pressure is applied to a workpiece rest, then the workpiece rest may be combined with no shim. Therefore, the thickness of a shim may be adjusted to a range including nil.

As shown in FIG. 16, the workpiece rests 132a, 132b support the two weld members 32b of the central air tube 16a which are slightly spaced from each other in a transverse direction perpendicular to the directions X. The positions of the workpiece rests 132a, 132b with respect to the instrument panel 12 correspond to a front lower portion of the instrument panel 12 as it is oriented when used as a final product. The workpiece rests 132a, 132b have respective upper surfaces which are inclined through large angles θ2.

The workpiece rests 132c through 132e support respective pairs of welded members 32b of the defroster air tube 16c with the instrument panel 12 interposed therebetween. The pairs of welded members 32b of the defroster air tube 16c have respective upper surfaces for supporting the instrument panel 12 thereon, the upper surfaces being inclined through different angles θ1. Specifically, as shown in FIG. 16, the angle θ1 of the upper surface of the workpiece rest 132c for supporting the right pair of welded members 32b is of a positive value, and the angle θ1 of the upper surface of the workpiece rest 132e for supporting the left pair of welded members 32b is of a negative value. The angle θ1 of the upper surface of the workpiece rest 132d for supporting the central pair of welded members 32b is nil. The three workpiece rests 132c through 132e are employed to provide these different angles θ1.

The workpiece rest 132f supports the storage box 14 with the instrument panel 12 interposed therebetween.

The workpiece rests 132g, 132h support the respective weld members 32b of the left and right end air tubes 16b with the instrument panel 12 interposed therebetween. Front faces of the portions of the instrument panel 12 to which the respective end air tubes 16b are welded will be covered with predetermined air grills and will not be visible when instrument panel 12 is used as a final product.

The protective members 24 are mounted on the upper surfaces of the respective workpiece rests 132a through 132h.

Figure 19:
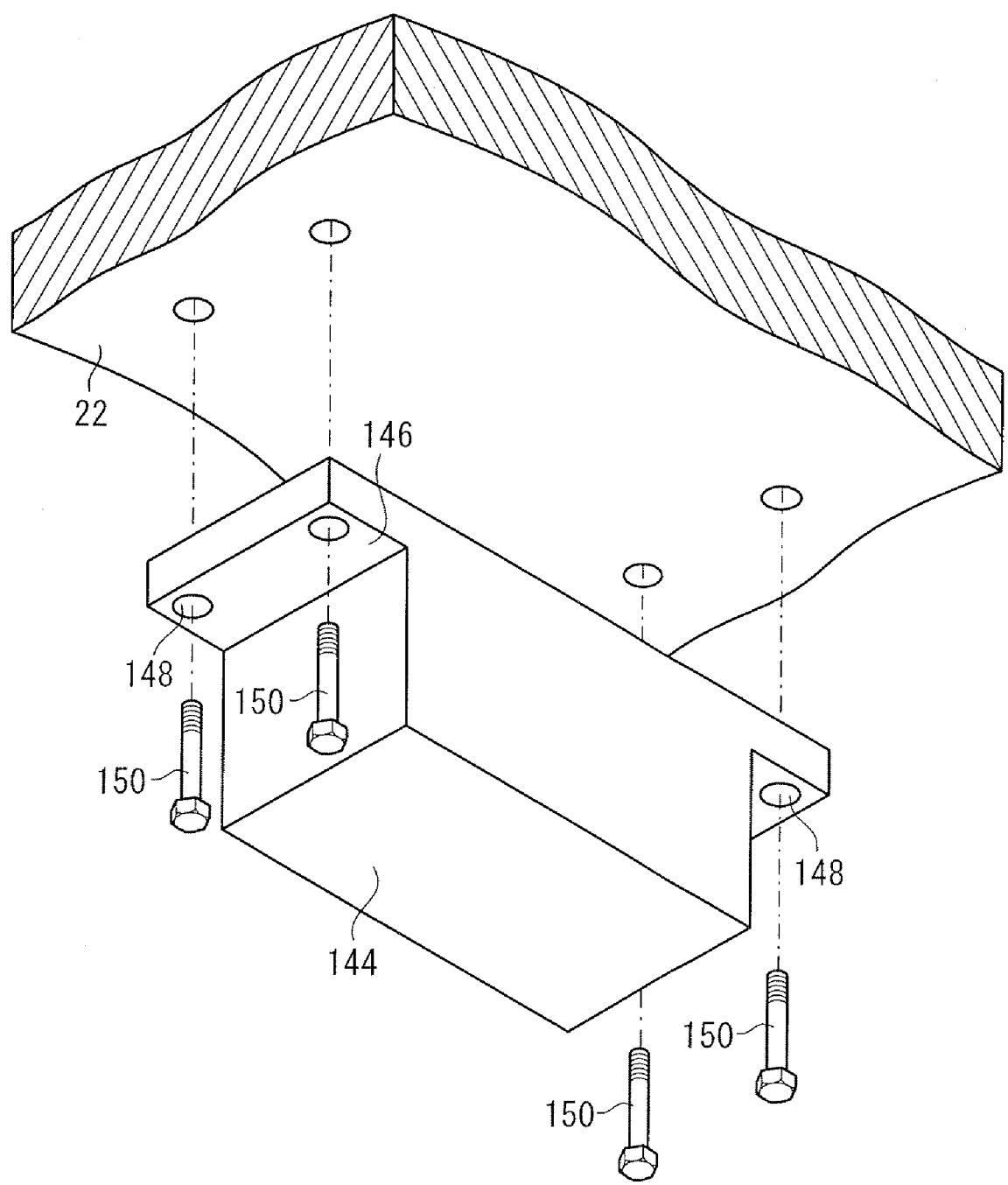
FIG. 19 is an enlarged exploded perspective view of a pusher bar.

As shown in FIG. 19, the vibrating plate 22 has a plurality of pusher bars 144 projecting toward the base plate 20 from an end face which faces the base plate 20. The pusher bars 144 correspond to the pusher bars 22a. Each of the pusher bars 144 has a wider wing 146 on its upper end which faces the vibrating plate 22, the wider wing 146 projecting laterally from opposite sides thereof. The wider wing 146 has screw holes 148 defined therein. The pusher bar 144 is fastened to the vibrating plate 22 by screws 150 extending through the screw holes 148 and threaded into the vibrating plate 22. A shim 140 (see FIG. 18) may also be interposed as a spacer between the wider wing 146 and the vibrating plate 22. However, according to the third embodiment, no shim 140 is interposed between the wider wing 146 and the vibrating plate 22.

The pusher bars 144 are made of aluminum, for example, as with the workpiece rests 132a through 132h.

The vibration welding apparatus 10c according to the third embodiment is basically constructed as described above. Operation and advantages of the vibration welding apparatus 10c will be described below.

The instrument panel 12 is placed on the workpiece rests 132a through 132h. Since the protective members 24 are disposed on the upper surfaces of the workpiece rests 132a through 132h, the instrument panel 12 is placed on the workpiece rests 132a through 132h with the protective members 24 interposed therebetween.

Then, the storage box 14 and the duct 16 are positioned and placed on the instrument panel 12. Alternatively, before the instrument panel 12 is placed on the workpiece rests 132a through 132h, the storage box 14 and the duct 16 may be positioned on and provisionally secured to the instrument panel 12, and then the instrument panel 12 may be placed on the workpiece rests 132a through 132h.

After the above preparatory process, a vibration welding process is performed by the vibration welding apparatus 10c. Specifically, the lifters 31 are actuated under the control of the controller 26 to lift the base plate 20 toward the vibrating plate 22.

The base plate 20 is lifted until finally the pusher bars 144 of the vibrating plate 22 and the base plate 20 clamp the weld rib 30a of the instrument panel 12 and the weld member 30b of the storage box 14 as layers therebetween, clamp the weld ribs 32a of the instrument panel 12 and the weld members 32b of the duct 16 as layers therebetween, and apply pressures to those weld ribs and members. Different pressures depending on the thicknesses of the shims 140 are applied to contacting surfaces of the weld rib 30a and the weld member 30b and also contacting surfaces of the weld ribs 32a and the weld members 32b.

Then, the vibrating plate 22 is vibrated laterally in the horizontal directions X with given amplitude and frequency by the vibrating means 27 under the control of the controller 26. When the vibrating plate 22 is thus vibrated, the contacting surfaces of the weld rib 30a and the weld member 30b and the contacting surfaces of the weld ribs 32a and the weld members 32b generate frictional heat, and are joined together by vibration welding.

As described above, the shim 140 has a smaller thickness at the workpiece rest 132f which supports the storage box 14 made of TPO having a relatively low melting point, and a greater thickness at the workpiece rests 132a through 132e, 132g, 132h which support the duct 16 made of PP having a relatively high melting point. Accordingly, the pressure applied to the workpiece rest 132f (the weld member 30b) is lower, and the pressure applied to the workpiece rests 132a through 132e, 132g, 132h (the weld members 32b) is higher.

When the storage box 14 and the duct 16 are joined to the instrument panel 12 by vibration welding, the amount of material melted from the melt member 30b whose melting point is lower and the amount of material melted from the weld members 32b whose melting point is higher are substantially equal to each other. Therefore, the storage box 14 and the duct 16 are substantially uniformly joined to the instrument panel 12.

According to the third embodiment, the duct 16 to which the higher pressure needs to be applied and the storage box 14 to which the lower pressure needs to be applied can be joined to the instrument panel 12 in one process. Stated other wise, it is not necessary to join the duct 16 and the storage box 14 in different processes. The number of steps of the vibration welding method carried out by the vibration welding apparatus 10c is relatively small, and the time required to manufacture a final product on the vibration welding apparatus 10c is relatively short.

During the vibration welding process, the instrument panel 12 is held in frictional contact with the protective members 24. However, since the protective members 24 are made of urethane and have a smooth and pliable surface and a lubricating ability, the product design surface 12a of the instrument panel 12 is protected against scratch.

After the vibrating plate 22 has been vibrated for a given period of time, or after material is melted from the weld ribs 30a, 32a and the weld members 30b, 32b to a given amount, the vibration of the vibrating plate 22 is stopped. The lifters 31 are actuated to lower the base plate 20, and the instrument panel 12, the storage box 14, and the duct 16 that have been joined together is removed as a welded product. In the welded product, the weld members 30b, 32b of the storage box 14 and the duct 16 are sufficiently melted into the instrument panel 12 for a sufficient level of welding strength. However, the vibration welding apparatus 10c prevents the weld members 30b, 32b of the storage box 14 and the duct 16 from being melted to excessive depths, so that the product design surface 12a of the instrument panel 12 will not be deformed.

If any of the protective members 24 on the workpiece rests 132a through 132h are worn after the above vibration welding process has been repeated, then the worn protective members 24 can be replaced with new ones. Since the protective members 24 are of a small area, they can easily be replaced and are of a low cost.

The vibration welding apparatus 10c is capable of handling instrument panels that are different in shape from the instrument panel 12, e.g., an instrument panel having a curved surface whose radius of curvature is different, an instrument panel having regions which are subject to a lower pressure because a resin workpiece to be joined thereto has a lower melting point, or an instrument panel having regions which are subject to a higher pressure because a resin workpiece to be joined thereto has a higher melting point, by changing the thicknesses and number of shims 140 disposed on workpiece rests for supporting those regions.

As the workpiece rests 132a through 132h are spaced from each other on the base plate 20, the shims 40 can be installed in place much more easily than if a shim 40 is installed between a single unitary workpiece rest and the base plate 20. In addition, the thicknesses of the shims 140 do not need to be set in view of dimensional errors of the instrument panel 12 and the duct 16 which are caused when they are manufactured.

In the third embodiment described above, no shims 140 are interposed between the vibrating plate 22 and the pusher bars 144. However, as described above, shims 140 may be interposed between the vibrating plate 22 and the pusher bars 144 to adjust the distance by which the pusher bars 144 project from the vibrating plate 22 for thereby adjusting frictional forces applied to the corresponding regions of the instrument panel 12.

The resin base is not limited to the instrument panel 12, but may be another member. The resin workpieces are not limited to the storage box 14 and the duct 16, but may be other resin workpieces.

Protective members 24 may also be mounted on distal end faces of the pusher bars 144. If protective members 24 are mounted on the distal end faces of the pusher bars 144, then the protective members 24 on the workpiece rests 132a through 132h may be dispensed with.

Shims 140 do not need to be interposed between all the workpiece rests 132a through 132h and the base plate 20. Specifically, no shims 140 need to be combined with those workpiece rests which support the regions of the instrument panel 12 to which a particularly small pressure is applied.

The present invention is not limited to a vibration welding process for simultaneously joining a plurality of resin workpieces having different melting spots to a resin base, but is also applicable to a vibration welding process for simultaneously joining a plurality of resin workpieces having the same melting point to flat and slanted surfaces of a resin base. In the absence of a shim 140, the pressure applied by the pusher bar or the vibrating plate to a flat surface is higher than the pressure applied to a slanted surface. However, the pressures applied to the flat and slanted surfaces can be equalized by increasing the thickness of a shim 140 combined with the workpiece rest or the pusher bar that is positioned at the slanted surface.

Although certain preferred embodiments of the present invention have been shown and described in detail, it should be understood that various changes and modifications may be made therein without departing from the scope of the appended claims.

What is claimed is:

1. A vibration welding method for welding a resin base and at least two resin workpieces to each other under pressure with vibration by clamping the resin base and the at least two resin workpieces as layers between a first vibratory member and a second vibratory member, comprising the steps of:

holding the at least two resin workpieces in contact with the resin base; and providing a protective member between the resin base and the first vibratory member and/or between the at least two resin workpieces and the second vibratory member, wherein the protective member comprises a urethane member, wherein a thickness of the protective member is different depending on a location where the protective member supports the resin base and/or the at least two resin workpieces; and vibrating at least one the first vibratory member and the second vibratory member relative to each other.

2. A vibration welding method according to claim 1, wherein the at least two resin workpieces in contact with the resin base are made of different materials, and wherein the thickness of the protective member is different depending on the material of the at least two resin workpieces at the location where the protective member supports the at least two resin workpieces.

3. A vibration welding method according to claim 1, wherein the thickness of the protective member is smaller as a melting point of the at least two resin workpieces at the location where the protective member supports the at least two resin workpieces is lower.

4. A vibration welding method according to claim 1, wherein the thickness of the protective member is set based on a tilt angle of a contacting surface of the resin base facing to one of the vibratory members at the location where the protective member supports the resin base.

5. A vibration welding method according to claim 4, wherein the thickness of the protective member is defined by a first tilt angle from a direction in which the first vibratory member and the second vibratory member are vibrated relatively to each other and a second tilt angle from a direction perpendicular to the first-mentioned direction.

6. A vibration welding method according to claim 5, further comprising the steps of:
holding the at least two resin workpieces in contact with the resin base at least at two locations, the tilt angles of contacting surfaces of the resin base facing to the first vibratory member being different at the two locations;
placing the resin base on at least one independent workpiece rest on the first vibratory member, the at least one independent workpiece rest depends on the tilt angles at the two locations; and
providing the protective member on the at least one independent workpiece rest held in contact with at least a product design surface.

7. A vibration welding method according to claim 6, wherein the at least one of the independent workpiece rest is devoid of the protective member.

8. A vibration welding method according to claim 1, further comprising the steps of:
providing a plurality of workpiece rests for supporting only a predetermined region of the resin base, the workpiece rests projecting toward the second vibratory member from a surface of the first vibratory member which faces the second vibratory member;
providing a plurality of bars for applying a pressure to the resin base and the at least two resin workpieces, the bars projecting toward the first vibratory member from a surface of the second vibratory member which faces the first vibratory member, wherein spacers are insertable at least between the first vibratory member and the workpiece rests; and
adjusting the thicknesses of the spacers to set the positions of upper end faces of the workpiece rests.

9. A vibration welding method according to claim 1, wherein the protective member is disposed on a product design surface of the resin base or the at least two resin workpieces.

10. A vibration welding method according to claim 1, wherein the resin base is made of polypropylene and the at least two resin workpieces are made of polypropylene and thermoplastic olefin.

11. A vibration welding apparatus for welding a resin base and at least two resin workpieces to each other under pressure with vibration, comprising:
a first vibratory member and a second vibratory member for clamping the resin base and the at least two resin workpieces as layers therebetween while at least one of the first and second vibratory members are being vibrated relative to each other, wherein the at least two resin workpieces are held in contact with the resin base; and
a protective member disposed between the resin base and the first vibratory member and/or between the at least two resin workpieces and the second vibratory member, wherein a thickness of the protective member is different depending on the location where the protective member supports the resin base and/or the at least two resin workpieces, and wherein the protective member comprises a urethane member.

12. A vibration welding apparatus according to claim 11, wherein the at least two resin workpieces which are held in contact with the resin base are made of different materials, and wherein the thickness of the protective member is different depending on the material of the at least two resin workpieces at the location where the protective member supports the at least two resin workpieces.

13. A vibration welding apparatus according to claim 11, wherein the thickness of the protective member is smaller as a melting point of the at least two resin workpieces at the location where the protective member supports the at least two resin workpieces is lower.

14. A vibration welding apparatus according to claim 11, wherein the thickness of the protective member is set based on a tilt angle of contacting surfaces of the resin base and one of the vibratory members at the location where the protective member supports the resin base.

15. A vibration welding apparatus according to claim 14, wherein the thickness of the protective member is defined by a first tilt angle from a direction in which the first vibratory member and the second vibratory member are vibrated relatively to each other and a second tilt angle from a direction perpendicular to the first-mentioned direction.

16. A vibration welding apparatus according to claim 15, wherein the at least two resin workpieces are held in contact with the resin base at least at two locations, the tilt angles of contacting surfaces of the resin base and the first vibratory member being different at the two locations;
the resin base is placed on independent workpiece rests on the first vibratory member, the independent workpiece rests depending on the tilt angles at the two locations; and
the protective member is placed on ones of the independent workpiece rests which are held in contact with a product design surface.

17. A vibration welding apparatus according to claim 16, wherein at least one of the independent workpiece rests is devoid of the protective member.

18. A vibration welding apparatus according to claim 11, further comprising:
a plurality of workpiece rests for supporting a predetermined region of the resin base, the workpiece rests projecting toward the second vibratory member from a surface of the first vibratory member which faces the second vibratory member; and
a plurality of bars for applying a pressure to the resin base and the at least two resin workpieces, the bars projecting toward the first vibratory member from a surface of the second vibratory member which faces the first vibratory member, wherein spacers are insertable at least between the first vibratory member and the workpiece rests; and the thicknesses of the spacers are adjusted to set the positions of upper end faces of the workpiece rests.

* * * * *